United States Patent
Pathak et al.

(10) Patent No.: US 10,572,805 B2
(45) Date of Patent: Feb. 25, 2020

(54) SERVICE MODELING AND EXECUTION

(71) Applicant: Tata Consultancy Services Limited, Mumbai, Maharashtra (IN)

(72) Inventors: Amrish Shashikant Pathak, Maharashtra (IN); Adwait Inamdar, Maharashtra (IN); Harrick Vin, Maharashtra (IN); Krithesh Shetty, Maharashtra (IN); Nikita Aggarwal, Maharashtra (IN); Paulomi Basak, Maharashtra (IN); Rahul Kelkar, Maharashtra (IN); Shreya Patel, Maharashtra (IN)

(73) Assignee: TATA CONSULTANCY SERVICES LIMITED, Mumbai, Maharashtra ( * ) Notice: Subject to any disclaimer, the term of this patent is extended or adjusted under 35 U.S.C. 154(b) by 788 days.

(21) Appl. No.: 14/514,611

(22) Filed: Oct. 15, 2014

(65) Prior Publication Data
US 2015/0106322 A1   Apr. 16, 2015

(30) Foreign Application Priority Data

Oct. 15, 2013   (IN) .......................... 3243/MUM/2013

(51) Int. Cl.
*G06N 5/02* (2006.01)
(52) U.S. Cl.
CPC .................................... *G06N 5/025* (2013.01)
(58) Field of Classification Search
CPC ........ G06N 5/02–025; G06F 8/10; G06F 8/35
(Continued)

(56) References Cited

U.S. PATENT DOCUMENTS 5,452,453 A *   9/1995   Ando .................... G06N 5/046
                                                  717/104
5,857,190 A *   1/1999   Brown ............... H04N 7/17318
(Continued)

OTHER PUBLICATIONS

MathWorks, "Simulink—Simulation and Model-Based Design", downloaded from <https://www.mathworks.com/products/simulink.html> on Aug. 18, 2018 (Year: 2018).*
(Continued)

*Primary Examiner* — Jason D Mitchell
(74) *Attorney, Agent, or Firm* — HM Law Group LLP; Vanintheran Moodley, Esq.

(57) ABSTRACT

Disclosed is method and system for modeling and executing service operation associated with technical service. Method comprises modeling of knowledge required for execution of service operation by representing factual knowledge and actionable knowledge in executable form. Modeling comprises representing standard operators and service operation. Service operation comprises parameters and rules presented in form of list of predicate-action pairs. Predicate-action pair comprises predicate and action. Predicate defines condition to be verified to comply with rule, and action specifies standard operator to be executed based on verification of condition. Method further comprises execution of service operation. Execution of service operation comprises selecting each predicate-action pair from list of predicate-action pairs and supplying subset of parameters to predicate of each predicate-action pair, verifying condition using subset of parameters, selecting standard operator based on verification of condition, supplying subset of parameters to standard operator, executing the standard operator by using subset of parameters.

20 Claims, 13 Drawing Sheets

(58) Field of Classification Search
USPC .......................................................... 717/104
See application file for complete search history.

(56) References Cited

U.S. PATENT DOCUMENTS

| | | | |
|---|---|---|---|
| 6,601,233 B1* | 7/2003 | Underwood | G06F 8/24 |
| | | | 717/100 |
| 7,278,156 B2 | 10/2007 | Mei et al. | |
| 7,444,646 B2* | 10/2008 | Su | G06F 9/4411 |
| | | | 717/106 |
| 7,472,103 B1* | 12/2008 | Yang | G06F 8/34 |
| | | | 706/52 |
| 7,490,073 B1 | 2/2009 | Qureshi et al. | |
| 7,657,328 B2* | 2/2010 | Terashima | H04H 20/86 |
| | | | 455/302 |
| 8,037,449 B2* | 10/2011 | Iborra | G06F 8/30 |
| | | | 717/105 |
| 9,218,409 B2* | 12/2015 | Weinberg | G06F 17/30595 |
| 2002/0064267 A1* | 5/2002 | Martin | H04M 3/42 |
| | | | 379/201.01 |
| 2002/0133581 A1* | 9/2002 | Schwartz | H04L 12/2803 |
| | | | 709/223 |
| 2003/0004746 A1* | 1/2003 | Kheirolomoom | G06Q 10/10 |
| | | | 717/104 |
| 2003/0045275 A1* | 3/2003 | McDonagh | H04W 8/18 |
| | | | 455/414.1 |
| 2003/0200533 A1* | 10/2003 | Roberts | G06F 8/24 |
| | | | 717/124 |
| 2004/0088411 A1* | 5/2004 | Jakubowski | G06Q 30/02 |
| | | | 709/225 |
| 2005/0080661 A1* | 4/2005 | Casati | G06Q 30/02 |
| | | | 709/224 |
| 2005/0096960 A1* | 5/2005 | Plutowski | G06F 17/30905 |
| | | | 705/7.29 |
| 2006/0106745 A1* | 5/2006 | Armstrong | G06N 5/025 |
| | | | 706/47 |
| 2006/0230389 A1* | 10/2006 | Moulckers | G06Q 10/06 |
| | | | 717/127 |
| 2007/0011281 A1* | 1/2007 | Jhoney | G06Q 10/10 |
| | | | 709/220 |
| 2007/0169015 A1* | 7/2007 | Seelig | G06F 11/36 |
| | | | 717/136 |
| 2007/0185930 A1* | 8/2007 | Betz | H04L 67/02 |
| 2007/0277163 A1* | 11/2007 | Avresky | G06F 8/43 |
| | | | 717/140 |
| 2008/0092109 A1* | 4/2008 | Kinnucan, Jr. | G06F 8/10 |
| | | | 717/105 |
| 2008/0127178 A1* | 5/2008 | Smith | G06F 8/61 |
| | | | 717/175 |
| 2008/0154830 A1* | 6/2008 | Gschwind | G06N 5/02 |
| | | | 706/47 |
| 2008/0163156 A1* | 7/2008 | Grey | G06F 8/24 |
| | | | 717/101 |
| 2008/0222096 A1* | 9/2008 | Ungureanasu | G06F 21/6227 |
| 2008/0222606 A1* | 9/2008 | Solirov | G06F 8/71 |
| | | | 717/122 |
| 2009/0112786 A1* | 4/2009 | Abels | G06N 5/025 |
| | | | 706/47 |
| 2009/0125500 A1* | 5/2009 | Arends | G06F 17/30507 |
| 2009/0222793 A1* | 9/2009 | Frank | G06F 9/542 |
| | | | 717/114 |
| 2009/0281996 A1* | 11/2009 | Liu | G06F 8/10 |
| 2010/0049729 A1* | 2/2010 | Black | G06F 17/3092 |
| | | | 707/803 |
| 2010/0114618 A1* | 5/2010 | Wilcock | G06Q 10/06 |
| | | | 705/7.37 |
| 2010/0235808 A1* | 9/2010 | Dayan | G06F 11/3438 |
| | | | 717/104 |
| 2011/0041116 A1* | 2/2011 | Sampath | G06F 8/10 |
| | | | 717/101 |
| 2011/0202655 A1* | 8/2011 | Sharma | G06Q 10/06 |
| | | | 709/224 |
| 2011/0213885 A1* | 9/2011 | Kelkar | G06F 9/5072 |
| | | | 709/226 |
| 2011/0277027 A1* | 11/2011 | Hayton | H04L 63/0815 |
| | | | 726/8 |
| 2011/0302239 A1* | 12/2011 | Grateau | G06F 17/30082 |
| | | | 709/203 |
| 2011/0320396 A1 | 12/2011 | Hunt et al. | |
| 2012/0240103 A1 | 9/2012 | Padmanabhuni et al. | |
| 2012/0254827 A1* | 10/2012 | Conrad | G06F 8/35 |
| | | | 717/104 |
| 2012/0254830 A1* | 10/2012 | Conrad | G06F 11/3604 |
| | | | 717/106 |
| 2013/0117747 A1* | 5/2013 | Balko | G06F 9/466 |
| | | | 718/100 |
| 2014/0033167 A1* | 1/2014 | Solovey | G06F 8/35 |
| | | | 717/104 |
| 2014/0189637 A1* | 7/2014 | Wu | G06F 8/35 |
| | | | 717/105 |
| 2014/0351787 A1* | 11/2014 | Ziegler | H04L 67/34 |
| | | | 717/104 |

OTHER PUBLICATIONS

National Instruments, "What Is LabVIEW", downloaded from <http://www.ni.com/en-us/shop/labview.html> on Aug. 18, 2018 (Year: 2018).*

* cited by examiner

SERVICE MODELING AND EXECUTION

CROSS REFERENCE TO RELATED APPLICATIONS AND PRIORITY

The present application claims priority to Indian Patent Application No. 3243/MUM/2013, filed on Oct. 15, 2013, the entirety of which is hereby incorporated by reference.

TECHNICAL FIELD

The present subject matter described herein, in general, relates to knowledge modeling and execution, and more particularly to knowledge modeling and execution associated with service industries.

BACKGROUND

Conventionally software organizations rely on human resources for knowledge acquisition, sharing and application of the knowledge in numerous ways. In service and support industries, enormous amount of the knowledge is available, mainly with human resources. The knowledge is utilized for analysis and resolution of problems arising in routine service and support work. Hence, there is a need for managing the knowledge hidden in the human resources and the knowledge residing in current implementations. More particularly there is a need to share and document tacit knowledge in the human resources and the knowledge available in the current software implementations to make the knowledge available and reusable. Modeling brings in a methodical way of structuring the knowledge enabling reusability of the knowledge. Modeling of the knowledge also means that there is no more hidden knowledge in individuals and in documents, scripts, implementations and configurations.

Some part of the knowledge in the service industries is available in the form of executables like scripts, runbooks and in the software implementations and configurations. While the other part of the knowledge resides in the human resources in the form of tacit knowledge. There is no effective way existing in the art to make the tacit knowledge and the knowledge in the documents, scripts, software implementations and configurations reusable and maintainable in the service industries. The knowledge developed for issue/request resolutions in the service industry is not uniform and is very specific to underlying technologies. For example, the knowledge of a database, captured for installation of the database on an operating system, is very specific to the underlying operating system. Hence, the knowledge capturing specific to the underlying technology creates duplication of knowledge. For example, there is duplication of knowledge for Oracle™ installed on Windows™ and Oracle™ installed on Linux™. The duplication of the knowledge in every place, throughout the organization, has detrimental effects. Further, the knowledge is not uniform or in standardized form, in all places of the organization. This results in loss of memory space or improper use of memory space.

Non-uniformity of the knowledge arises due to a fact that rules for creating the knowledge are either not defined or are not standardized. For example, the knowledge for checking file existence can be named in various ways as 'CheckFileExistence' or 'CheckFile' or 'CheckFileExists' or any other similar name. The knowledge is a part of many different individuals and comes from a large number of authors. Hence, involvement of the large number of authors results in the non-uniformity of the knowledge. It is imperative to address challenges related to the non-uniformity of the knowledge and duplication of the knowledge to avoid hurdles of crowd sourcing of the knowledge.

SUMMARY

This summary is provided to introduce aspects related to systems and methods for modeling and providing a technical service and the aspects are further described below in the detailed description. This summary is neither intended to identify essential features of the claimed subject matter nor is it intended for use in determining or limiting the scope of the claimed subject matter.

In one implementation, a method for modeling and executing a service operation associated with a technical service is disclosed. The method comprises modeling of knowledge required for execution of the service operation by representing factual knowledge and actionable knowledge, of the knowledge, in executable form. The modeling of the knowledge comprises representing, by a processor, one or more standard operators and the service operation. The one or more standard operators represent the factual knowledge in the executable form. The service operation comprises rules and parameters. The rules are present in form of a list of predicate-action pairs. The list of predicate-action pairs represents the actionable knowledge in the executable form. A predicate-action pair of the list of predicate-action pairs comprises a predicate and an action. The predicate defines a condition to be verified to comply with a rule of the rules, and the action specifies at least one standard operator of the one or more standard operators to be executed based on the verification of the condition. The method further comprises executing the service operation. The execution of the service operation further comprises selecting, by the processor, each predicate-action pair from the list of predicate-action pairs. The execution of the service operation further comprises supplying, by the processor, a first subset of parameters to the predicate of the each predicate-action pair. The execution of the service operation further comprises verifying, by the processor, the condition defined in the predicate of the each predicate-action pair by using the first subset of parameters to comply with the rule. The execution of the service operation further comprises selecting the at least one standard operator based on the verification of the condition of the each predicate-action pair. The at least one standard operator is selected and executed when the condition is true/satisfied. The execution of the service operation further comprises supplying, by the processor, a second subset of parameters to the at least one standard operator of the each predicate-action pair and executing, by the processor, the at least one standard operator, by using the second subset of parameters, for each predicate-action pair.

In one implementation, a system for modeling and executing a service operation associated with a technical service is disclosed. The system comprises a processor and a memory coupled to the processor. The processor is capable of executing a plurality of modules stored in the memory. The plurality of module comprises a representation module and an execution module. The system models knowledge required for execution of the service operation by representing factual knowledge and actionable knowledge, of the knowledge, in executable form. The representation module models the knowledge by representing one or more standard operators and the service operation. The one or more standard operators represent the factual knowledge in the executable form. The service operation comprises rules and parameters. The rules are present in form of a list of predicate-action pairs. The list of predicate-action pairs represents the actionable knowledge in the executable form. A predicate-action pair of the list of predicate-action pairs comprises a predicate and an action. The predicate defines a condition to be verified to comply with a rule of the rules, and the action specifies at least one standard operator of the one or more standard operators to be executed based on the verification of the condition. The execution module executes the service operation by selecting each predicate-action pair from the list of predicate-action pairs. The execution module supplies a first subset of parameters to the predicate of the each predicate-action pair. Further, the execution module verifies the condition defined in the predicate of the each predicate-action pair by using the first subset of parameters to comply with the rule. The execution module selects the at least one standard operator from the action of the each predicate-action pair, based on the verification of the condition for each predicate-action pair, and supplies a second subset of parameters to the at least one standard operator of each predicate-action pair. In one scenario, the at least one standard operator is selected and executed, when the condition is true. The execution module executes the at least one standard operator, by using the second subset of parameters, for each predicate-action pair. Thereby the system models and executes the service operation to provide the technical service.

In one implementation, a non-transitory computer readable medium embodying a program executable in a computing device for modeling and executing a service operation associated with a technical service is disclosed. The program models knowledge required for execution of the service operation by representing factual knowledge and actionable knowledge, of the knowledge, in executable form. The program comprises a program code for representing one or more standard operators and the service operation. The one or more standard operators represent the factual knowledge in the executable form. The service operation comprises rules and parameters. The rules are present in form of a list of predicate-action pairs. The list of predicate-action pairs represents the actionable knowledge in the executable form. A predicate-action pair of the list of predicate-action pairs comprises a predicate and an action. The predicate defines a condition to be verified to comply with a rule of the rules, and the action specifies at least one standard operator of the one or more standard operators to be executed based on the verification of the condition. The program further comprises a program code for executing the service operation. The program code for executing the service operation executes the service operation by selecting, each predicate-action pair from the list of predicate-action pairs. The program code for executing the service operation, further supplies a first subset of parameters to the predicate of the each predicate-action pair. The program code for executing the service operation verifies the condition defined in the predicate of the each predicate-action pair by using the first subset of parameters to comply with the rule. The program code for executing the service operation selects the at least one standard operator from the action of each predicate-action pair, based on the verification of the condition of the each predicate-action pair. In one scenario, the at least one standard operator is selected and executed, when the condition is true. The program code for executing the service operation supplies a second subset of parameters to the at least one standard operator for the each predicate-action pair and executes the at least one standard operator, by using the second subset of parameters, for the each predicate-action pair.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for modeling and executing a service operation associated with a technical service are described. For example, the technical service is 'a database instance as a service', 'Operating System Instance as a service' and so on. In order to model the service operation, knowledge required for execution of the service operation may be modeled by representing factual knowledge and actionable knowledge, of the knowledge, in executable form. The modeling of the service operation may comprise receiving one or more standard operators and the service operation. The standard operator is an atomic action to be carried on an entity specified as an executable knowledge. The standard operator represents the factual knowledge. The service operation may comprise the knowledge for servicing a request or solving an issue in a service industry.

The service operation may comprise rules and parameters. The rules may be present in form of a list of predicate-action pairs. The list of predicate-action pair represents the actionable knowledge in the executable form. A predicate-action pair may comprise a predicate and an action. The predicate may define a condition to be verified, to comply with a rule of the rules. The action may specify at least one standard operator to be executed based on the verification of the condition.

Post modeling the service operation, the service operation may be executed. In order to execute the service operation, each predicate-action pair from the list of predicate-action pairs may be selected and a first subset of parameters may be supplied to the predicate of each predicate-action pair. Further, the condition defined in the predicate of each predicate-action pair may be verified, by using the first subset of parameters, in order to comply with the rule. Further, the at least one standard operator of the action of each predicate-action pair may be selected based on the verification of the condition, and a second subset of parameters may be supplied to the at least one standard operator of each predicate-action pair. The at least one standard operator may be executed by using the second subset of parameters for each predicate-action pair.

Further, one or more technical resources and/or one or more technical tools may be received for modeling and executing the service operation associated with the technical service. The one or more technical resources may comprise bindings, standard operators and service operations. The one or more technical tools may comprise the bindings, standard operators and the service operations.

While aspects of described system and method for modeling and executing a service operation associated with a technical service may be implemented in any number of different computing systems, environments, and/or configurations, the embodiments are described in the context of the following exemplary system.

Figure 1:
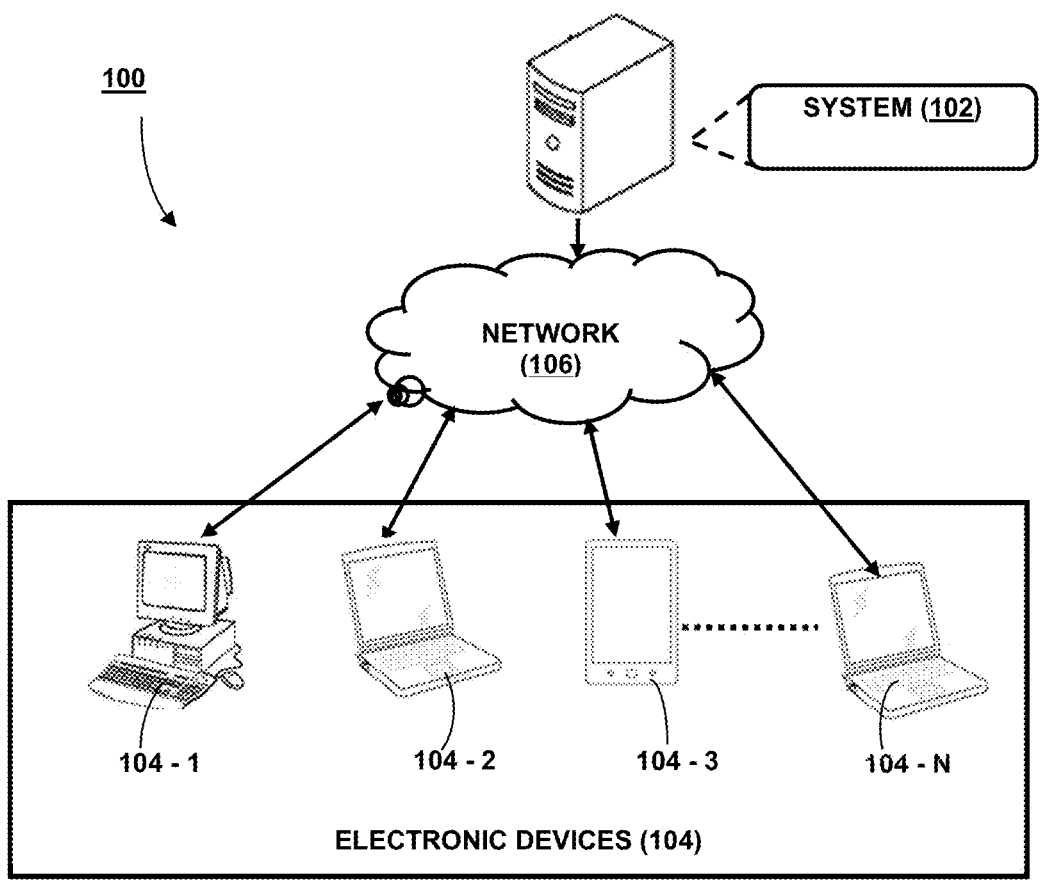
FIG. 1 illustrates a network implementation of a system for modeling and executing a service operation associated with a technical service, in accordance with an embodiment of the present subject matter.

Referring now to FIG. 1, a network implementation 100 of a system 102 for modeling and executing a service operation associated with a technical service is illustrated, in accordance with an embodiment of the present subject matter. The system 102 models knowledge required for execution of the service operation by representing factual knowledge and actionable knowledge, of the knowledge, in executable form. In one embodiment, the system 102 models the knowledge by receiving one or more standard operators and the service operation. The one or more standard operators represent the factual knowledge in the executable form. The service operation comprises rules and parameters. The rules are present in form of a list of predicate-action pairs. The list of predicate-action pairs represents the actionable knowledge in the executable form. The system 102 executes the service operation by selecting each predicate-action pair from the list of predicate-action pairs.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), remote direct memory access (RDMA), and the like, to communicate with one another. Further the network 106 may include a variety of network devices, including routers, bridges, servers, computing devices, storage devices, and the like.

Figure 2:
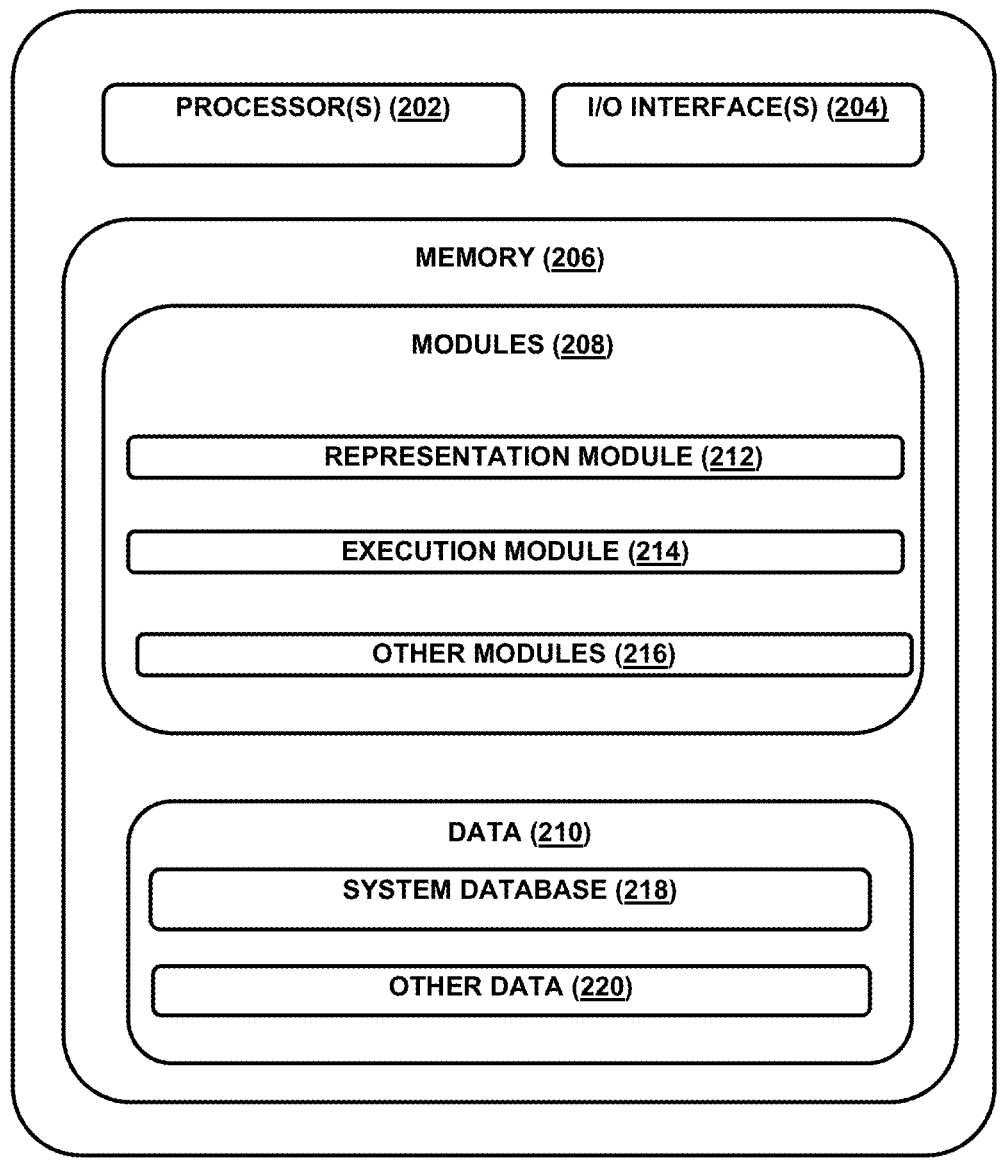
FIG. 2 illustrates the system for modeling and executing the service operation associated with the technical service, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a representation module 212, an execution module 214, and other modules 216. The other modules 216 may include programs or coded instructions that supplement applications and functions of the system 102.

The data 210, amongst other things, serves as a repository for storing data processed, received, and generated by one or more of the modules 208. The data 210 may also include a system database 218 and other data 220. The other data 220 may include data generated as a result of the execution of one or more modules in the other modules 216.

In one implementation, at first, a user may use the client device 104 to access the system 102 via the I/O interface 204. The user may register them using the I/O interface 204 in order to use the system 102. The working of the system 102 may be explained in detail in FIGS. 3 to 11 explained below. The system 102 may be used for modeling and executing a service operation associated with a technical service. In order to model and execute the service operation associated with the technical service, the system models knowledge required for execution of the service operation by representing factual knowledge and actionable knowledge in executable form. The technical service may implement one or many life cycle services. The life cycle services may comprise provisioning service, incident management, compliance service, and service request. The technical service may comprise operational knowledge known to a person skilled in the art. By way of an example, the technical service is a platform as a service, an infrastructure as a service, and the like. In some embodiments, Oracle™ Instance as a Service, RHEL (Red Hat Enterprise Linux™) instance as a Service, Web Logic Instance as a Service, and Application Instance as a Service are few examples of the technical services. The technical service is associated with one or more service operations and one or more standard operators. The technical service may be implemented by using the one or more service operations and the one or more standard operators. The service operation may comprise one or more tasks associated with the technical service.

According to an embodiment of the present disclosure, information/data present in an organization may be captured in an entity-relationship model. Further, knowledge structures may be automatically generated from the information captured in the entity-relationship model. The knowledge structures may comprise the service operations and the standard operators. The information captured in the entity-relationship model may be analyzed for completeness and accuracy. In one embodiment of the present disclosure, the knowledge structures are auto generated; hence the knowledge structures are uniform and structured. Uniformity of the knowledge structures gives advantage of abstracting a technical resource/a technical tool/a technical service easily. The technical resource may be an operating system, an operating platform. For example, a standard operator for creating a file may be named uniformly across various operating systems. Uniform naming of the standard operator makes abstract calling of the standard operator simple, problem free. Further, the standard operator can be called irrespective of underlying operating system's implementation. Hence various technical services based on a technical resource type, for example the operating system, can be modeled independent of the underlying operating system's implementation. Modeling of the technical service, independent of the underlying operating system's implementation, makes the knowledge structures reusable, wherein the knowledge structures includes the standard operators, the service operations, the technical services, the technical resources, the technical tools and the like.

Figure 3:
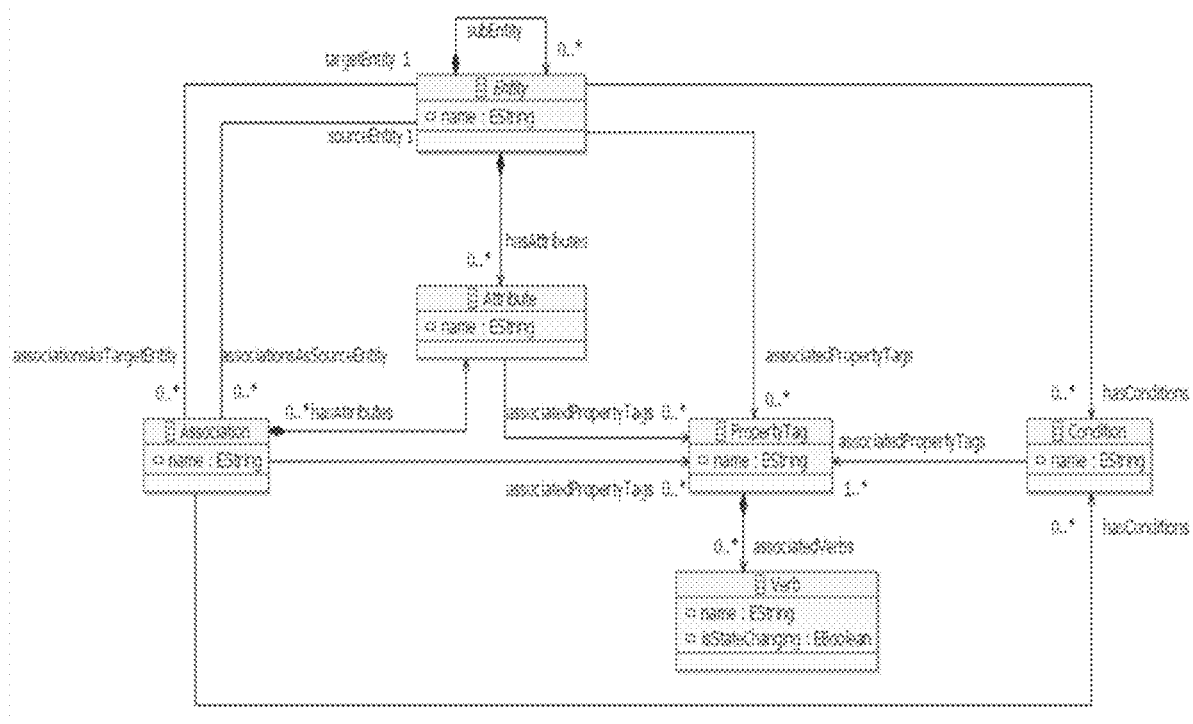
FIG. 3 illustrates capturing of information present in an organization in an entity-relationship model, in accordance with an exemplary embodiment of the present subject matter.

Referring to FIG. 3 capturing of the information present in the organization in the entity-relationship model is illustrated. Information associated with a technical resource can be modeled in a standardized way to create a model of the technical resource. Further the knowledge structures may be generated from the model of the technical resource. The technical resource may comprise multiple entities. Each entity of the multiple entities may have attributes and properties. Further, a relationship may be present between the entities. For example the technical resource may be an operating system, an entity may be a user and a File, and entity-relationship is 'granting permission to the user on a File'. Examples of the entities may include Operating System, Linux™, and Windows™, Database, Oracle™ and the like. Further each entity may be composed of multiple sub-entities. Examples of the sub-entities of the entity such as 'Operating System' may comprise User, Group, Hard Disk, Memory, CPU, Process, and the like. An entity at highest level in the entity relationship model may be translated to a technical resource or a technical tool in generation of the knowledge structures. Example of the entity at the highest level may be an "Operating System" entity. The entity composed of multiple sub-entities, may be depicted by 'sub-entity' relation in the entity-relationship model as shown in FIG. 3.

According to an exemplary embodiment, information is associated with the entity. There may be various entities present in the organization. Various operations may be performed on the entities. For example, the various operations may be creation of a user, deletion of the user, and updating the user. In another example, granting permission to the user on a file, setting name of the user and retrieving the name of the user. An operation to be performed on the entity may be termed as 'verb'. The verbs may be associated with entities by using 'Property Tags'. The entities may have an association with one another. For example, 'a User has access to File' is the association between two entities the user and the file. The association further may have information such as properties/attributes, property tag and condition.

In one embodiment, the properties/attributes of the association are explained. Elements in the technical resource may have 'properties' like version, vendor, IP address, hostname and the like. The association may have 'properties' like access, such as read-only access, read-write access and the like. The properties of the elements and/or the association may be termed as 'attributes'. The attribute is depicted by 'has Attributes' in the entity-relationship model shown in FIG. 3.

In one embodiment, the property tag of the association is explained. The attribute may have one or more 'property tags'. Example of the property tag comprises one or more verbs. A verb of the one or more verbs is an operation to be performed on the entity, or the association or the attribute. The verb may be selected from create, delete, update, set, get, handle and the like. For example, the property tag may be formed containing the verbs such as create, delete and update and the like. The property tag is depicted by 'associatedPropertyTags' in the entity-relationship model.

In one embodiment, the condition of the association is explained. A state associated with the entity or the technical resource or technical tool may be termed as 'condition'. For example, Linux™ can go down or User can get locked, such states may be termed as 'condition'. The condition may also have property tags attached. The condition is depicted by 'hasConditions' relation in the entity-relationship model as shown in FIG. 3. Example of entity and description of the entity is shown in Table 1

TABLE 1

Description of Entity

Entity - Linux ™
Sub Entity - User
Attribute -
Linux ->version, IP address, hostname
User ->login Name, password
Property Tag -
User ->CONFIGURABLE
Verbs --
CONFIGURABLE → Create, Delete, Update, Check
Condition -
Linux ->Down
User ->UnableToLogin According to an embodiment, generation of knowledge structure is described. The entity, the association, the attribute, the property tag and the condition may be used to generate the knowledge structures such as a standard operator and a service operation. In one embodiment, generation of a structure of the standard operator is described. One or more property tags may be mapped to the entity or the association or the attribute, to perform various operations on the entity or the association or the attribute. Pair of the verb comprising associated property tag and the entity or the association or the attribute, represents an action to be performed on the entity or the association or the attribute. The pair of the verb and the entity or the association or the attribute, and properties of the pair of the verb and the entity or the association or the attribute form basis for generation of the structure of the standard operator.

Few examples of generation of the standard operators are explained below. Entity related standard operators are explained. The entity may be mapped with the verbs through the property tag. By way of an example, 'User' is mapped with verbs 'Create', 'Update', 'Delete' through the property tag. The property tag may be configured based on the requirement. The mapping of the verbs with the entity results in the standard operators such as 'CreateUser', 'UpdateUser', and 'DeleteUser'. The entity related standard operator generation is carried out as explained below.
Name of Standard Operator=Name of verb+Name of Entity
Parameters of Standard Operator=Attribute of Entity+Attributes of Parent Entity/Entities.

Attribute related standard operators are explained. The attribute may be mapped with the verbs through the property tag. Example of the attributes mapping is provided. Hostname (attribute of Linux™) is mapped with the verbs Get, Set and the like, through Read-Write property tag. The mapping of the attributes results in the standard operators 'GetLinuxHostname', 'SetLinuxHostname' and the like.

The attribute related standard operator's generation is explained below.
Name of standard operator=Name of verb+Name of entity in which attribute resides+Name of the attribute
Parameters of standard operator=Attributes of entity in which attribute resides+Attributes of Parent Entity+Attribute (only for set verb).

Association related standard operators are explained below. The association may be mapped with the verbs through the property tag. By way of an example, 'HasAccess' association (User has file access) is mapped with the verbs 'Create', 'Update', 'Delete' through the property tag. The mappings of the association with the verbs results in the standard operators such as 'CreateHasAccess', 'UpdateHasAccess', 'DeleteHasAccess'.

The association related standard operator's generation is explained below.
Verb Related Generation:
Name of Standard Operator=Name of verb+Name of the source Entity+Name of Association+Name of target Entity
Parameters of Standard Operator=Attributes of Source Entity+Attributes of Parent Entities of Source Entity+Attributes of Parent Entities of Target Entity+Attributes of Target Entity+Attributes of the Association
Attribute Related Generation:
Name of Standard Operator=Name of verb+Name of the source Entity+Name of Association+Name of the target Entity+Name of the attribute
Parameters of Standard Operator=Attributes of Source Entity+Attributes of Parent Entities of Source Entity+Attributes of Parent Entities of Target Entity+Attributes of Target Entity+Attributes of the Association+Attribute (for set verb only)

For every association, direction of the association defines a source entity and a target entity. The association defines an association between the source entity and the target entity. For example, if the association is 'User has Permissions on a File'. Then for the association 'has Permissions', 'User' becomes 'the Source Entity' and 'File' becomes 'the Target Entity'. Another example is the association 'User belongs To Group', where 'User' is the source entity 'Group' is the target entity for the association 'belongs To.'

Referring to FIG. 3, in the entity-relationship model, sub-entity may be used to define Parent-Child relationship between entities. For example, 'Operating System has User' is modeled using the sub-entity relation to depict that 'Users' exist within an 'Operating System'. In this case 'OperatingSystem' becomes the Parent Entity for the 'User'. Multiple levels of such relationships may exist. For example 'OperatingSystem' has 'FileSystem' and 'FileSystem' has a File. In this case 'OperatingSystem' is the Parent entity of 'FileSystem' and which 'FileSystem' itself is a parent entity for the File. So in the context of File following relationship is true.
Parent Entity=FileSystem
Parent Entities={OperatingSystem, FileSystem}

According to an embodiment, generation of the service operation is explained below. The service operation may be generated using a state changing property of the verb and the conditions, specified in the model. There may be two types of the service operations such as 'Wrapper service operations' and 'Issue type service operations'. Generation of the 'Wrapper service operations' is explained. Some of the verbs by definition may be state changing verbs. The state changing verbs can change a state of a model element, when the state changing verb is operating on the model element. The entity, the association, the attributes, and the like may be the model elements. The standard operators originating from the state changing verbs form basis for generation of the service operation.

For example, the verb 'Create' is the state changing verb, as the verb 'Create' can change the state of the infrastructure element, wherein the verb 'Create' is operating on the infrastructure element. Hence Standard Operators CreateUser, CreateFile and the like may be used to generate respective service operations.

For Example, a service operation 'CreateUser SOP' is generated as the 'wrapper service operation' for the standard operator 'CreateUser'. By way of the example, the generation of the 'wrapper service operations' may depend on following details:

Name of Service Operation=Name of Standard Operator+ '_SOP';
Parameters of Service Operation=Parameters of Standard Operator According to an embodiment, generation of the 'Issue type service operation' is explained. The entity may be in a state that may need assistance. For example, 'Linux™ is down' is a state. The state may be defined by the condition (mapped for entity, association and so on). Further the verb may be associated with the condition through the property tag. The verb associated with the condition represents one or more operations to be performed (on the entity) when the state arises. The operations to be performed, when the state arises, form basis for the generation of the 'Issue type service operation'.

For Example: 'Linux™ is down' is a condition and property tag 'Resolvable' (having 'Handle' verb) is mapped with the condition 'Linux™ is down'. 'Linux™ is down' condition results into service operation 'HandleLinux-Down'.

By way of an example, the structure generation of the 'Issue type service operation' depends on following details:
Name of Service Operation=Name of Verb+Name of Entity (or association)+Name of Condition
Parameters of Standard Operator=Attributes of corresponding Entity (or association)+Attributes of Parent Entities of corresponding Entity (or Source and Target Entities of association+Attributes of Parent Entities of source and target entity)

Specifically, in the present implementation, modeling of the service operation is accomplished by the representation module 212.

Representation Module

Referring to FIG. 2, a detailed working of the representation module 212 along with the working of other components of the system 102 is illustrated, in accordance with an embodiment of the present subject matter. In one implementation, the representation module 212 models a knowledge required for execution of a service operation by representing factual knowledge and actionable knowledge, of the knowledge, in executable form. In one implementation, in order to model the knowledge required for execution of the service operation, the representation module 212 may receive/represent one or more standard operators, and one or more service operations. In one embodiment, the one or more standard operators and the one or more service operations may be provided by the user or may be received from the system database 218. According to an alternate embodiment, the one or more standard operators and the one or more service operations may be generated from the information available in the organization by the representation module 212. In some embodiments, plurality of standard operators and plurality of service operations may be stored in a knowledge repository such as the system database 218 and may be accessed by the representation module 212. The one or more standard operators may represent the factual knowledge in the executable form. A service operation of the one or more service operations may comprise the knowledge required for resolution of an issue or servicing a request. The service operation may comprise parameters and rules associated with the service operation.

The rules may be provided in form of a list of predicate-action pairs. The list of predicate-action pairs may represent the actionable knowledge in the executable form, required for the resolution of the issue or servicing the request. The list of predicate-action pairs represents the actionable knowledge in the executable form. A predicate-action pair of the list of predicate-action pairs may comprise a predicate and an action. The predicate may define a condition to be verified to comply with a rule of the rules. The predicate may define a combination of two or more conditions to be verified to comply with the rule. The examples of the conditions may include existence of the parameters, emptiness of the parameters, sufficiency of the parameters, check return of the standard operator, exit code is not equal to '0', and exit code is other than '0' and the like. The action may specify at least one standard operator of the one or more standard operators to be executed based on the verification of the condition. In alternate embodiment, the action may specify at least one service operation and/or the one or more standard operators to be executed based on the verification of the condition.

A standard operator of the one or more standard operators may be an atomic action to be carried on an entity specified as the executable form of the factual knowledge. The standard operators may be considered as modular individual tasks that can be used by the service operations. By way of an example, a standard operator for 'UserAddition' for Linux™ operating system can be specified using a 'useradd' Linux™ command. The standard operator may comprise a set of factors, an executable function, a return and an output, and a timeout. The set of factors may collect the second subset of the parameters. The executable function may comprise a command or a script, a language, and a target server. The command or the script may be executed in order to perform a task. The command may use the set of factors and may provide the return or the exit status in the return and output of execution in the 'output' part. The language may specify a language of the command or the script. The target server may specify information about a host, wherein the command or the script is to be executed on the host. The return may collect an exit code as a result of an execution of the command or the script. The output may collect an output message or an error message as the result of the execution of the command or the script. The timeout may specify a time acceptable for the execution of the command or the script.

According to an exemplary embodiment, the standard operator comprises the executable command or an executable function. Each technical service is associated with specific executable functions or specific executable commands. For example, if a value of a parameter is to be printed for Linux™, then a command may be written as 'echo $a', whereas for Windows™ the command may be written as 'Write-Host {$a}'. Although the action is the same, the commands are different for Linux™ and Windows™. Hence, Linux™ and Windows™ may have different sets of commands and the different sets of commands may be defined in the form of standard operators. The standard operators may be reused within same service operation and may also be reused by other service operations. Table 2 and table 3 shows examples of the standard operators.

TABLE 2

Example of a standard operator

| Standard Operator Name | ServiceStatus |
|---|---|
| Action | ssh ${ServiceStatus:Hostname} service ${ServiceStatus:ServiceName} status |
| Parameters: | |
| Hostname | 10.0.3.152 |
| ServiceName | cups |

TABLE 2-continued

Example of a standard operator

| | |
|---|---|
| ServiceStatus:Return | 0 |
| ServiceStatus:Output | cupsd (pid 12155) is running . . . |
| ServiceStatus:Return | 3 |
| ServiceStatus:Output | cupsd is stopped |
| ServiceStatus:Return | 1 |
| ServiceStatus:Output | cups: unrecognized service |

TABLE 3

Example of a standard operator

| | |
|---|---|
| Standard Operator Name | GetFileSizeInKB |
| Action | ssh ${GetFileSizeInKB:Hostname} du -sk ${GetFileSizeInKB:FileDirName} \|awk '{print $1}' \| tr -d '\n' |
| Parameters: | |
| Hostname | 10.0.3.152 |
| FilDirName | /etc |
| GetFileSizeInKB:Return | 0 |
| GetFileSizeInKB:Output | 149800 |

The parameters may comprise data required for execution of the service operation. The parameters may comprise the data required for execution of the one or more standard operators. Examples of the parameters may include host name, database instance name, login name, and the like. The parameters may be provided by the user or may be fetched from the system database 218, at the time of selection of the service operation or selection of the standard operator. The parameters may be pre-stored in the system database 218.

In an embodiment, the action in the predicate-action pair may specify at least one standard operator of the one or more standard operators to be executed based on the verification of the condition. The action further may specify at least one of one or more service operations and/or built-in functions to be executed based on the verification of the condition. The built-in functions may comprise eject, resolve and log. The 'Eject' built-in function may terminate the service operation with a 'failure' as a status. The 'Resolve' built-in function may terminate the service operation with a 'success' as the status. The 'Log' built-in function may be used to store information associated with the service operation execution log.

The service operation may further comprise a service operation return, a service operation output, and an alert. The service operation output may signify one or more key-value pairs. For example, a 'CreatUser' Service Operation output can be as UserID: btaylor1 and Password: password123. The 'UserID' is a key and 'btaylor1' is a value, collectively forming a key-value pair. The service operation return may signify the status of termination of the service operation. The status of termination of the service operation may be successfully resolved (success) or unsuccessful (failure) and ejected. The alert may signify one or more events to be serviced by the service operation.

Figure 4:
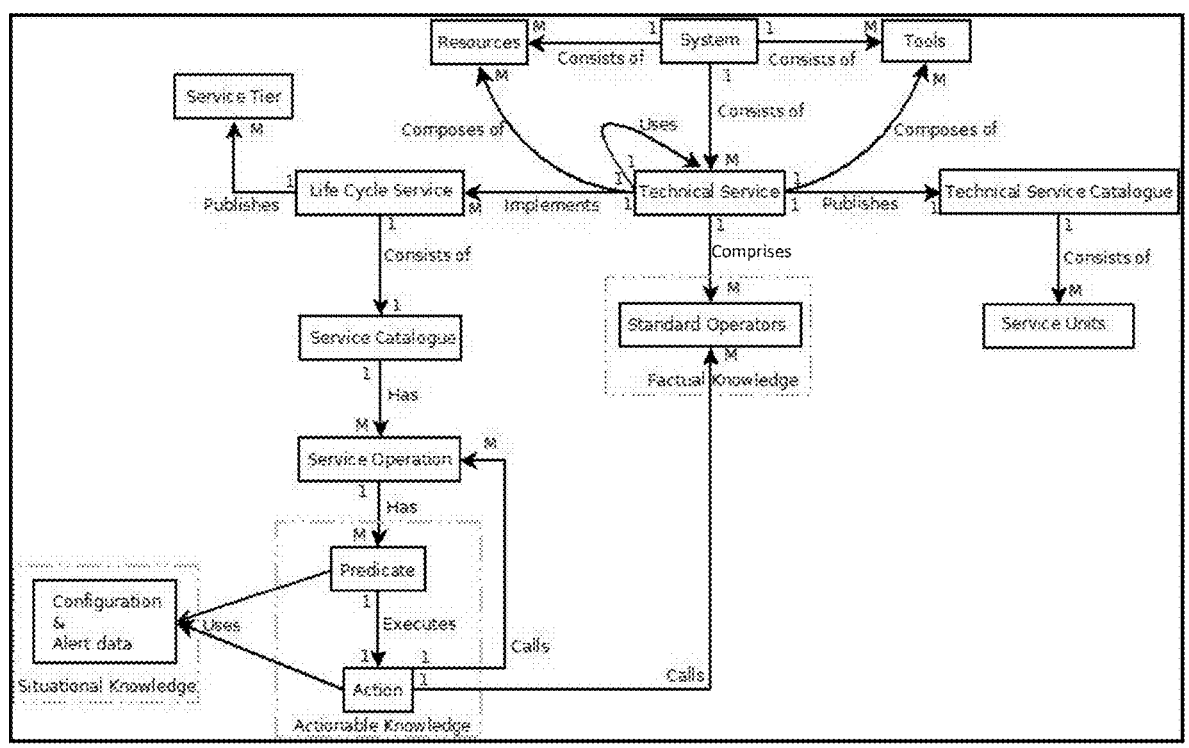
FIG. 4 illustrates a model for implementation of a technical service, in accordance with an exemplary embodiment of the present subject matter.

Referring to FIG. 4, a model of implementation of the technical service is explained. A software system may be defined by one or many technical services (e.g. Linux RHEL™ 6.3 as a Service, Windows™ 2008 as a Service, etc.) and one or more technical resources (e.g. Linux RHEL™ 6.3, Windows™ 2008 R2, etc.) and/or one or more technical tools (e.g. Arago™, Bladelogic™, Nagios™, and the like). The technical service can use another one or more technical services. The technical services may be implemented through one or more life cycle services. The one or many life cycle services may be provisioning service, incident management, compliance service, service request and the like. The life cycle service may have a service catalogue. The service catalogue may comprise one or more service operations. The service operations for the technical service can be of type incident management, service request, compliance service and provisioning service and the like. Each life cycle service associated with the technical service may be defined with service tiers depending on time period of maintenance. The technical service may be defined with a set of service units such as Large Physical, Small Virtual, and the like, depending on RAM size, Memory, and the like. The service units may be defined as functional units for the technical service. The service unit may represent features of the technical service. The features of the technical service may depend upon the service level agreements and configuration attributes. Depending on type of instance, the service unit may be categorized into Physical or Virtual machine. Depending on the service size, i.e., number of CPU per core, RAM size, Disk size, the service unit may be categorized into Large, Medium and Small. Also depending on maintenance time period (24×7 or 24×5), availability, data redundancy, the service units may be categorized into Gold, Silver.

For example, the technical service is a 'Linux RHEL™ 6.3 as a Service'. The 'Linux RHEL™ 6.3 as a Service' uses 'LinuxRHEL™6.3' as a technical resource and 'Arago™' as a technical tool. The service operations of the technical service can use the standard operators of multiple technical resources and/or multiple technical tools. The service operations of 'Linux RHEL™6.3 as a Service' use the standard operators and the service operations of 'LinuxRHEL™6.3' and 'Arago™'. For example, the technical service such as 'Oracle™ instance as a Service' uses the technical resources RHEL™ and Oracle™. The technical service 'Oracle™ instance as a Service' can implement other service operations which do not belong to RHEL™ and Oracle™, but can use standard operators from Oracle™ and RHEL™. One technical service can use multiple technical services, for example Oracle™ as a Service may call RHEL™ as a technical service for OS instance. The system 102 may implement multiple technical services.

Figure 5:
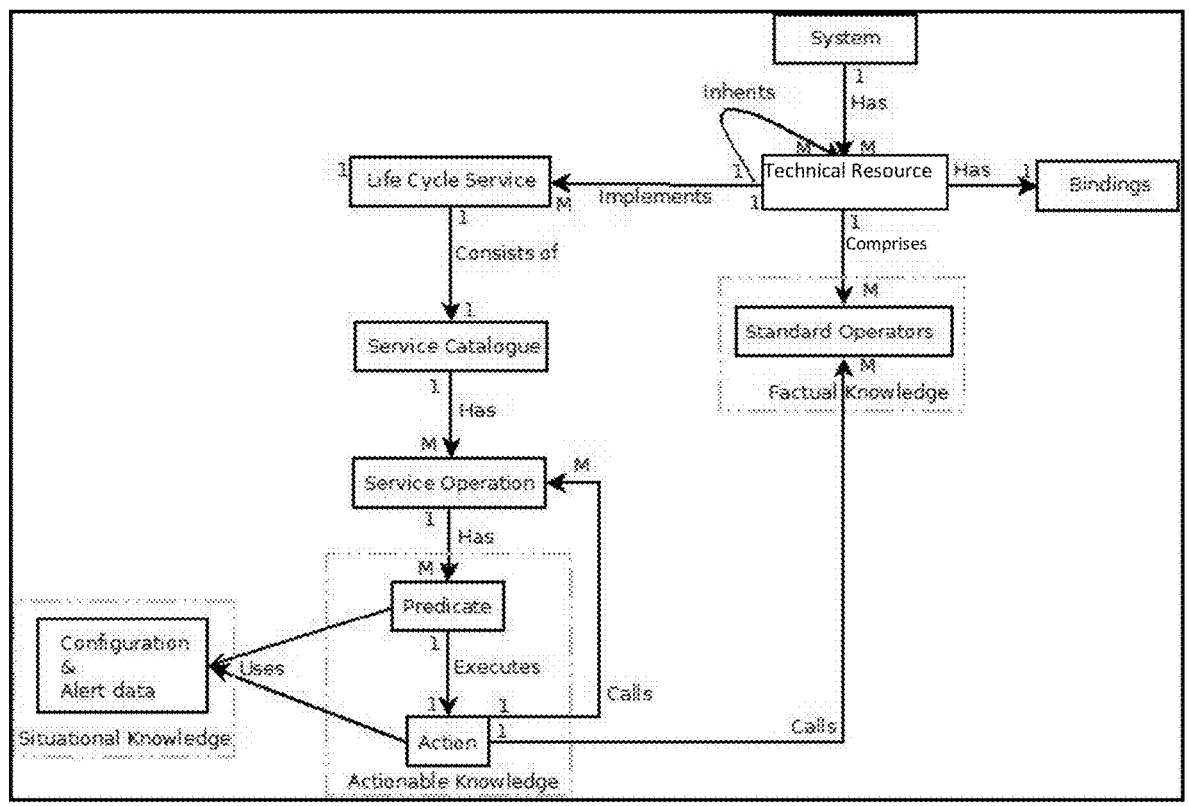
FIG. 5 illustrates a model for implementation of a technical resource, in accordance with an exemplary embodiment of the present subject matter.
Figure 6:
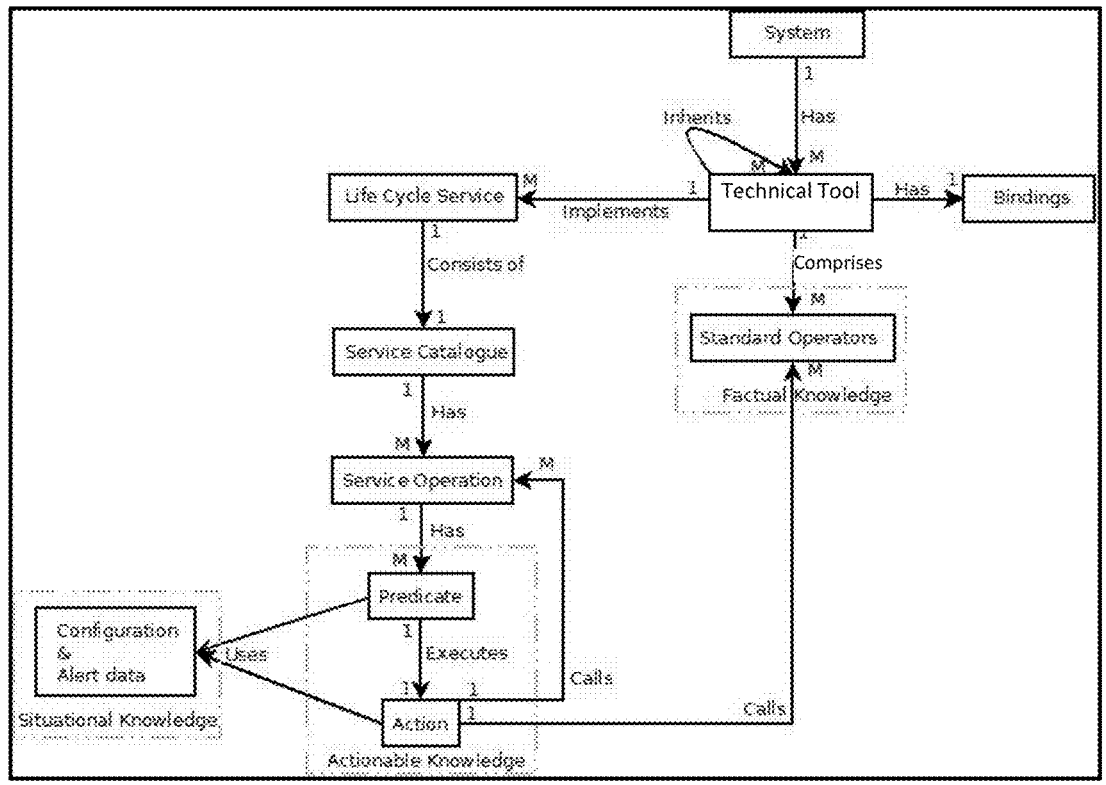
FIG. 6 illustrates a model for implementation of a technical tool, in accordance with an exemplary embodiment of the present subject matter.

Referring to FIG. 5, a model for implementation of the technical resource is explained. The technical resource comprises a set or repository of standard operators and a set or repository of service operations, specific to each technology. The technical resource works on principle of inheritance, i.e., Parent-Child relationship. A child node can inherit the properties of its parent only. The properties of the child in turn cannot be used by its parent. Referring to FIG. 6, meta-model for implementation of the technical tool is explained. The technical tools are based on similar concept as technical resources. The technical service, the technical resource and the technical tool comprises the standard operators as factual knowledge, the service operations comprising predicate-action pairs as actionable knowledge and configuration and alert data as situational knowledge. The actionable knowledge that is the predicate-action pairs, during execution of the action, calls the standard operators as factual knowledge. Further, the predicate-action pairs, based on situation, use the configuration and alert data as the situational knowledge, during execution of the predicate-action pair.

The technical resource may comprise one or more bindings. The technical tools may also comprise the one or more bindings. The one or more bindings may comprise execution environment details associated with the technical resource or the technical tool. For example, the one or more bindings may comprise a version of the technical resource or the technical tool. For example, the one or more bindings for the technical resource—RHEL™ 5.3 may comprise Major Version: 5, Minor Version: 3, Vendor: Red Hat™ and so on.

According to an embodiment of the present disclosure, the representation module 212 may receive one or more technical resources required for modeling and executing the service operation associated with the technical service. The one or more technical resources may comprise at least one parent resource and at least one child resource. The at least one parent resource may comprise at least one of a set of parent resource standard operators and one or more parent resource service operations. The at least one child resource may comprise at least one of a set of child resource standard operators and one or more child resource service operations. The at least one parent resource and the at least one child resource may be associated with each other in a parent-child relationship. The parent-child relationship may signify that the at least one child resource inherits the at least one of the set of parent resource standard operators and the one or more parent resource service operations.

While using a parent resource standard operator of the set of parent resource standard operators and a child resource standard operator of the set of child resource standard operators, there may be conflict with a title/name of the parent resource standard operator and the child resource standard operator. When the parent resource standard operator conflict with the child resource standard operator, then the child resource standard operator overrides the parent resource standard operator. The overriding of the child resource standard operator comprises overriding of the executable function of the parent resource standard operator. While using a parent resource service operation of the set of parent resource service operations and a child resource service operation of the set of child resource service operations, there may be conflict with a title/name of the parent resource service operation and the child resource service operation. When the parent resource service operation conflict with the child resource service operation, then the child resource service operation overrides the parent resource service operation. The overriding of the child resource service operation may comprise overriding of the rules of the parent resource service operation.

At least one of the parent resource standard operator, the parent resource service operation, the child resource standard operator and the child resource service operation may be selected based on the verification of the condition of the predicate-action pair, and may be executed for execution of the service operation.

According to an embodiment of the present disclosure, the representation module 212 may receive one or more technical tools required for modeling and executing the service operation associated with the technical service. The one or more technical tools may comprise at least one parent tool and at least one child tool. The at least one parent tool may comprise at least one of a set of parent tool standard operators and one or more parent tool service operations. The at least one child tool comprises at least one of a set of child tool standard operators and one or more child tool service operations. The at least one parent tool and the at least one child tool may be associated with each other in a parent-child relationship. The parent-child relationship may signify that the at least one child tool inherits the at least one of the set of parent tool standard operators and the one or more parent tool service operations.

When a parent tool standard operator of the set of parent tool standard operators conflict with a child tool standard operator of the set of child tool standard operators, then the child tool standard operator overrides the parent tool standard operator. The overriding of the child tool standard operator comprises overriding the executable function of the parent tool standard operator. When a parent tool service operation of the one or more parent tool service operations conflict with a child tool service operation of the one or more child tool service operations, then the child tool service operation overrides the parent tool service operation. The overriding of the child tool service operation comprises overriding the rules of the parent tool service operation.

At least one of the parent tool standard operator, the parent tool service operation, the child tool standard operator and the child tool service operation may be selected based on the verification of the condition of the predicate-action pair, and may be executed for execution of the service operation.

According to an exemplary embodiment, the modeling of the knowledge in structured format is explained. The knowledge is present in structured format across multiple units in a hierarchical manner, possessing parent-child relationship. The units are classified into various types' namely technical service, technical resource, technical tool, service operations and standard operators. The technical service comprises one or more service operations. The technical service further can use one or more technical resources and/or one or more technical tools for implementation of the technical service.

Figure 7:
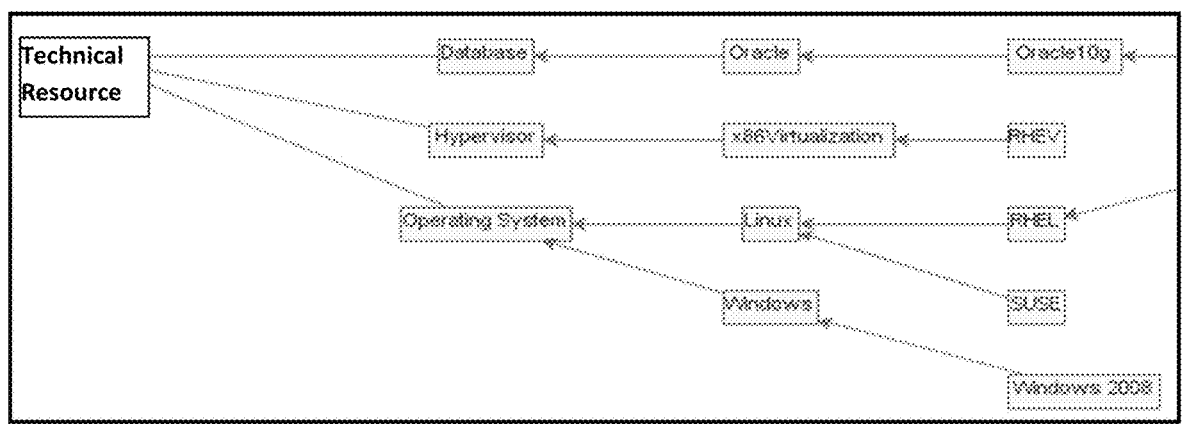
FIG. 7 illustrates inheritance in technical resources and technical tools, in accordance with an exemplary embodiment of the present subject matter.

Referring to FIG. 7, inheritance in technical resources and technical tools is explained. The technical resources may include basic components of infrastructure of information technology services. For example, the technical resources may comprise operating systems, databases and the like. The technical tools may comprise tools used in the infrastructure technology services. For example, the technical tools may include monitoring tools, ticketing tools and the like. The technical resource may be a collection of sub-technical resources comprising at least one parent resource and at least one child resource. The at least one parent resource and the at least one child resource may be associated with each other in a parent-child relationship. The at least one parent resource may comprise at least one of a set of parent resource standard operators and one or more parent resource service operations. The at least one child resource comprises at least one of a set of child resource standard operators and one or more child resource service operations. The parent-child relationship may signify that the at least one child resource inherits at least one of the set of parent resource standard operators and the one or more parent resource service operations. The child resource may use the set of parent resource standard operators and the one or more parent resource service operations from the parent resources.

According to an exemplary embodiment of the present disclosure, the technical resource comprises a set of standard operators and one or more service operations specific to each technology. The technical resource works on principle of inheritance i.e. child-parent relationship. A child resource can inherit/use the properties of (its) the parent resource only. The properties of the child resource in turn cannot be inherited/used by (its) the parent resource. Referring to example provided in the FIG. 7, the technical resource is main parent of various technologies as shown in the FIG. 7. For example, 'Operating System' is a child of 'Technical Resource'. 'Operating System' has children namely—Linux™, Windows™ etc. Linux™ has children namely—RHEL™ and SUSE™ and so on. There are certain commands executable only in RHEL™, certain commands executable only in SUSE™ and certain commands executable in both SUSE™ and RHEL™. The commands specific to RHEL™ are considered as the standard operators of RHEL™ only. No technology can use standard operators of other technology except for the child of the same technology. Same goes with SUSE™. But commands which are common to both RHEL™ and SUSE™ are considered as standard operators specific to Linux™.

According to an exemplary embodiment, RHEL™ and SUSE™ are children of Linux™, RHEL™ and SUSE™ can use standard operators of Linux™. But the standard operators of RHEL™ and SUSE™ cannot be used by Linux™. Also, Linux™ and Windows™ being children of Operating System, Linux™ and Windows™ has own set of standard operators. But as there cannot be any common executable commands between Linux™ and Windows™, so Operating System do not have any common standard operator implementations to Linux™ and Windows™, however the Operating System can define standard operators without implementations. For example, standard operators CreateUser, DeleteUser and so on can be defined at Operating System level, but actions for the CreateUser, DeleteUser standard operators may not be specified at the Operating System level. The actions for the standard operators such as the CreateUser, DeleteUser can be specified by implementations of Operating System like Linux™, Windows™ and the like. The service operations of Linux™ use the standard operators of Linux™. On the other hand, the service operations of RHEL™ uses the standard operators of RHEL™ as well as that of Linux™, as RHEL™ is a child of Linux™, so RHEL™ inherits all the standard operators of Linux™.

The concept of inheritance of the technical resources may similarly work for the technical tools. According to the concept of inheritance, the service operations can use the standard operators of their own technical resource or technical tool. But cases may occur when a service operation requires more than one technical tools and/or technical resources. In that case, the service operations are categorized under technical services and the service operations, and use the standard operators of multiple technical resources as well as multiple technical tools.

By way of an example, HP™ Service Manager and Remedy™ are the technical tools belonging to a parent technical tool 'ITSM™ (Information Technology service management)'. Standard operators and service operations of 'ITSM™' are inherited by both HP™ Service Manager and Remedy™, but the standard operators of HP™ Service Manager are used by HP™ Service Manager only and the standard operators of Remedy™ are used by Remedy™ only.

Execution Module

Referring to FIG. 2, a detailed working of the execution module 214 along with the working of other components of the system 102 is illustrated, in accordance with an embodiment of the present subject matter. In one implementation, the execution module 214 executes the one or more service operations. In one implementation, in order to execute the service operation of the one or more service operations, the execution module 214 may select each predicate-action pair from the list of predicate-action pairs and execute each predicate-action pair. While executing each predicate-action pair, the execution module 214 further may supply a first subset of parameters to the predicate of the predicate-action pair. Post supplying the first subset of parameters, the execution module 214 may verify the condition defined in the predicate of the predicate-action pair, by using the first subset of parameters. The condition may be verified in order to comply with the rule of the rules. Thus all the rules associated with the service operation may be verified by the conditions present in the predicate-action pairs of the service operation. The verification of the condition comprises verification of the satisfaction of the condition. The examples of the verification of the condition may include verifying existence of the parameters, verifying emptiness of the parameters, verifying sufficiency of the parameters, verifying check return of the standard operator, verifying that exit code is not equal to '0', verifying that exit code is other than '0' and the like. There may be more than one conditions combined with each other by using AND, OR and NOT operators. The conditions present in the predicate part of the predicate-action pair are verified in order to comply with the rules.

Based on the verification of the condition, the execution module 214 further may select the at least one standard operator present in the 'action' part of the predicate-action pair. Post selection of the at least one standard operator, the execution module may supply a second subset of parameters to the at least one standard operator of the predicate-action pair. The execution module 214 may supply a second subset of parameters to plurality standard operators based on presence of the plurality of standard operators in the action part and further selection of the plurality of standard operators from the action part. The execution module 214 may execute the at least one standard operator by using the second subset of parameters. The execution module 214 may execute the plurality of standard operators by using the second subset of parameters. The above mentioned steps such as selecting predicate-action pair, supply a first subset of parameters to the predicate, verify the condition defined in the predicate by using the first subset of parameters, selecting the at least one standard operator present in the 'action' part of the predicate-action pair, supplying a second subset of parameters to the at least one standard operator and executing the at least one standard operator by using the second subset of parameters, is carried out for each predicate-action pair of the list of predicate-action pair. Thereby the execution module 214 may execute the service operation associated with the technical service.

The parameters received by the representation module 212 may be divided into subsets of parameters. First subset of parameters of the subsets of parameters may be (selected from the parameters) based on requirement of the condition for verification. Second subset of parameters of the subsets of parameters may be selected based on requirement of the execution of the at least one standard operator. The parameters selected in the first subset of parameters may also get selected in the second subset of parameters. In some embodiments, the first subset of parameters may be similar as that of the second subset of parameters.

As described above, the action further may specify at least one of one or more service operations associated with the technical service and/or built-in functions, to be executed based on the verification of the condition. Based on the verification of the condition, the execution module 214 may select at least one of the one or more service operations and/or the built-in functions, as mentioned in the action of the predicate-action pair. Post selection of the at least one of the one or more service operations and/or the built-in functions, the second subset of parameters may be supplied to the at least one of the one or more service operations and/or built-in functions. The execution module may execute the at least one of the one or more service operations and/or the built-in functions by using the second subset of parameters. In another embodiment, the built-in functions may be executed without using the second subset of parameters or any parameters. Thereby the execution module 214 may execute the at least one of the one or more service operations associated with the technical service and/or the built-in functions, in order to provide the technical service.

According to an embodiment of the present disclosure, the output and/or the return of the execution of the standard operator along with the first subset of parameters may be supplied to the predicate of the predicate-action pair, of the list of predicate-action pairs, for verification of the condition defined in the predicate. According to another embodiment of the present disclosure, the service operation return and/or the service operation output of the execution of the service operation along with the first subset of parameters may be supplied to the predicate of the predicate-action pair, of the list of predicate-action pairs, for verification of the condition defined in the predicate. The verification of the condition may comprise verifying whether the return of the standard operator execution satisfies an arithmetic or string operations or logical operations or a time delay or the like. The verification of the condition may comprise verifying whether the output of the standard operator execution satisfies an arithmetic or string operations or logical operations or a time delay or the like.

According to another embodiment, the execution module may implement polymorphism while calling/executing the standard operator and/or the service operation, at runtime. For implementation of the polymorphism, the execution module may pick up best available/suitable implementation of standard operator and/or service operation based on matching of the execution environment data with one or more bindings for execution of the standard operator and/or the service operation. The one or more bindings may be mentioned in the technical resource or the technical tool or the technical service. The one or more bindings may identify the version of the technical resource or the technical tool or the technical service, wherein the standard operator and/or the service operation may be belonging to the technical resource and/or the technical tool and/or the technical service. For example, a service operation in 'Database Instance as a Service' calls a standard operator from 'Resource—Operating System' as a technical resource. The technical resource is executed in a Windows™ 2008 R2 execution environment. The standard operator implementation provided by the 'Resource—Windows™ 2008 R2' inherits from the 'Resource—Operating System' and specifies the one or more bindings mentioning version details for 'Windows™ 2008 R2'. The version details for the execution environment 'Windows™ 2008 R2' are matched against all the bindings of the Technical Resources inheriting from 'Resource—Operating System' to find a best match. In this case the best match is found in the 'Resource—Windows™ 2008 R2' hence the standard operator implementation specified in 'Resource—Windows™ 2008 R2' is picked up by the execution module for execution of the standard operator, wherein the standard operator is executed in 'Windows™ 2008 R2' execution environment. Thus by means of the polymorphism, the implementation of the technical service 'Database Instance as a Service' can be kept independent of underlying technology. The polymorphism may be similarly implemented during calling and/or execution of the service operation specified in the technical service, the technical resources and the technical tool.

The polymorphism technique may be implemented while executing at least one of a) the one or more standard operators and b) the service operation, at runtime. The implementation of the polymorphism technique comprises picking up of a standard operator implementation and/or a service operation implementation based on matching of the execution environment with one or more bindings for execution of the standard operator and/or the service operation. The one or more bindings comprise execution environment data provided in a technical resource or a technical tool or a technical service. The polymorphism technique enables execution of the service operation and execution of the standard operator independent of an underlying technology and enables reusability of the knowledge.

Figure 8:
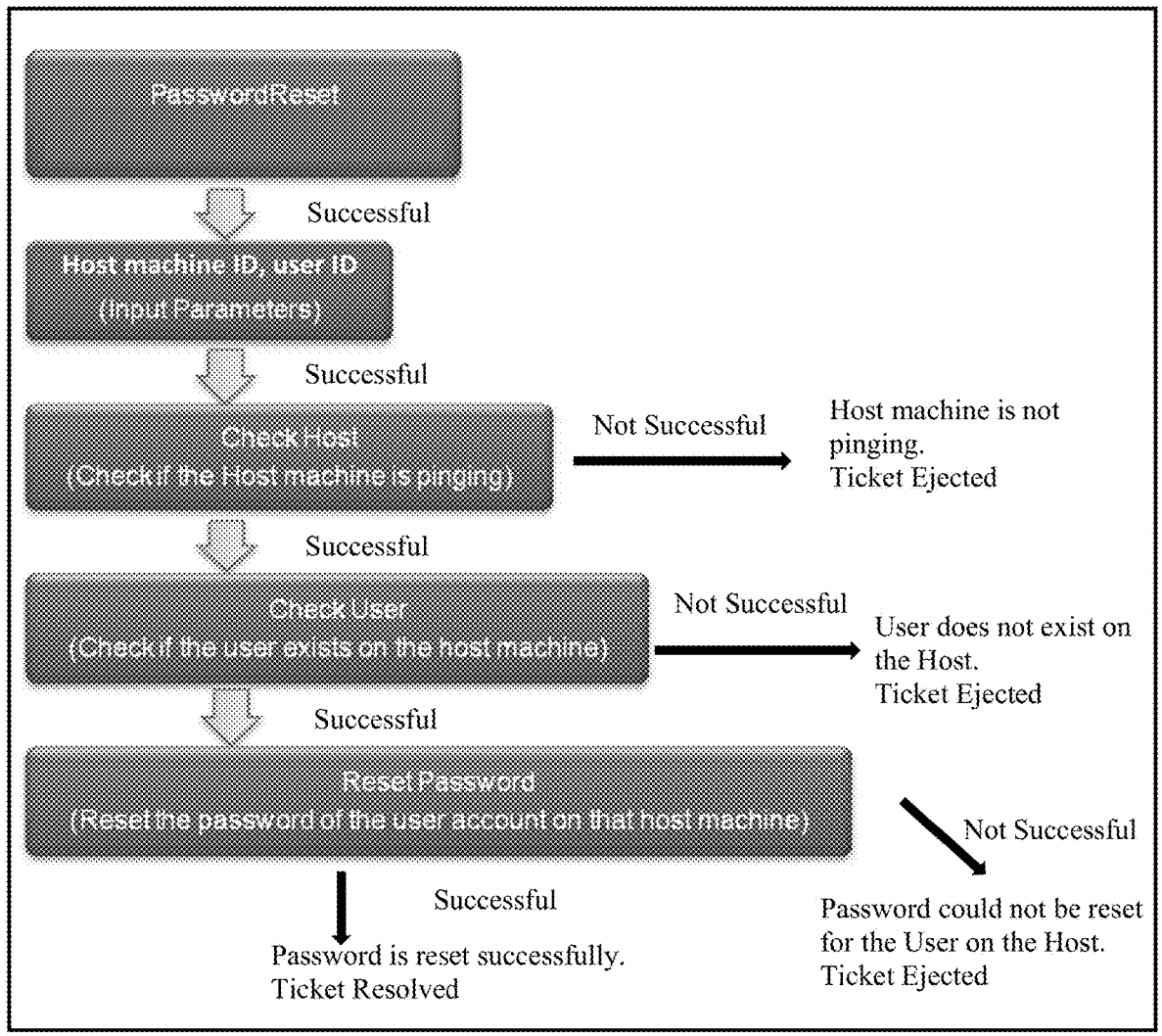
FIG. 8 illustrates a flowchart for execution of a task for resetting a password of a user account on a host machine, in accordance with an exemplary embodiment of the present subject matter.

According to an exemplary embodiment, referring to FIG. 8, a flowchart for execution of a task for resetting a password of a user account on a host machine is provided. Referring to FIG. 8, the execution of the task for resetting the password of the user account on the host machine is described. By way of an example, a ticket for resetting the password of the user account on the host machine may be raised in a ticketing tool. When the ticket is raised, necessary parameters such as a host machine ID and a user ID are supplied. Initially an operator checks whether host machine is pinging. If the host machine pings successfully, the operator checks for availability of the user ID on the host machine. If there is no availability of the user ID on the host machine, the ticket gets ejected. Secondly, if the user is available on the host machine, the operator further move on to reset the password for the user. Lastly, when the password is reset successfully, the ticket is closed as resolved or successful. If the resetting of password is unsuccessful, the ticket is closed as ejected or failed.

Figure 9:
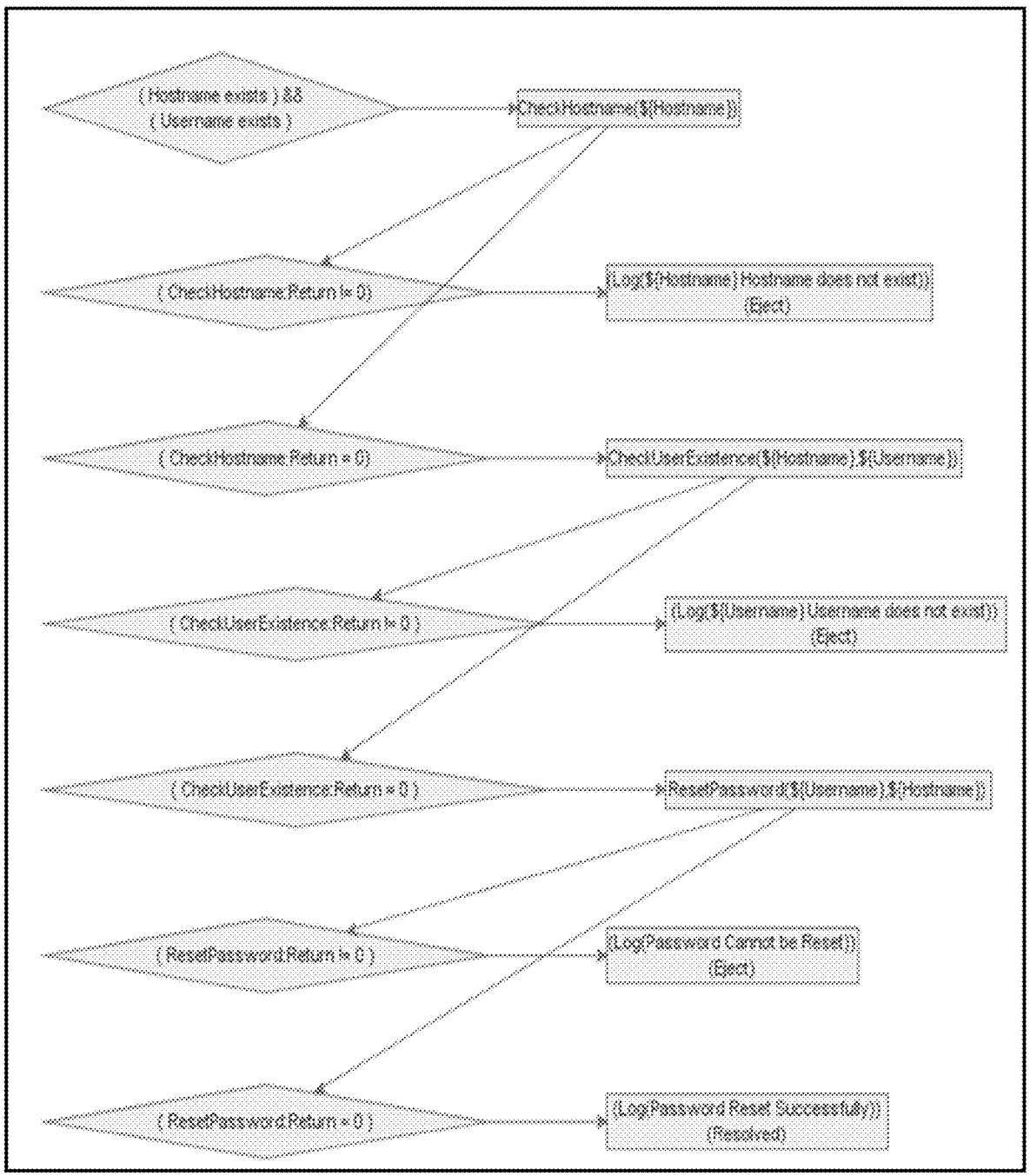
FIG. 9 illustrates a flowchart for modeling and execution of a service operation for resetting a password of a user account on a host machine, in accordance with an exemplary embodiment of the present subject matter.

Referring to FIG. 9, a flowchart for modeling and execution of a service operation for resetting a password of a user account on a host machine is described. The service operation comprises rules provided in the form of seven predicate-action pairs. The first predicate-action pair comprises a predicate having condition (Hostname exists) && (Username exists). The predicate is provided with the parameters such as Hostname and Username. The condition is checked by using the Hostname and the Username. As illustrated in FIG. 9, the predicates are written in rhombus shape boxes and the actions are written in rectangle shape boxes. Post verification of the condition, standard operator 'CheckHostname' from the 'action' part is called and the parameter the 'Hostname' is supplied to the standard operator 'CheckHostname'. In consecutive predicate-action pair, the predicate verifies a condition as CheckHostname: Return !=0. The condition checks if the standard operator 'CheckHostname' return is not equal to zero. If the condition 'CheckHostname: Return !=0' is true, then a 'Log' built-in function is called. The 'Log' built-in function is supplied with the Hostname. The Log built-in function inserts the log/record as 'Hostname does not exist'. Subsequently, Eject built-in function is called. Alternatively, if condition 'CheckHostname: Return !=0' is not true then the predicate from consecutive predicate-action pair verifies the condition as 'CheckHostname: Return=0'. If the condition 'CheckHostname: Return=0' is true, 'CheckUserExistence' is called with the parameters supplied 'Hostname' and 'Username'. Similarly remaining predicate-action pairs are executed. Thus the service operation of the resetting of the password of the user account on the host machine is either successfully resolved or if unsuccessful, then the service operation is ejected based on the satisfaction of the conditions mentioned in the predicates of the predicate-action pairs.

Figure 10A:
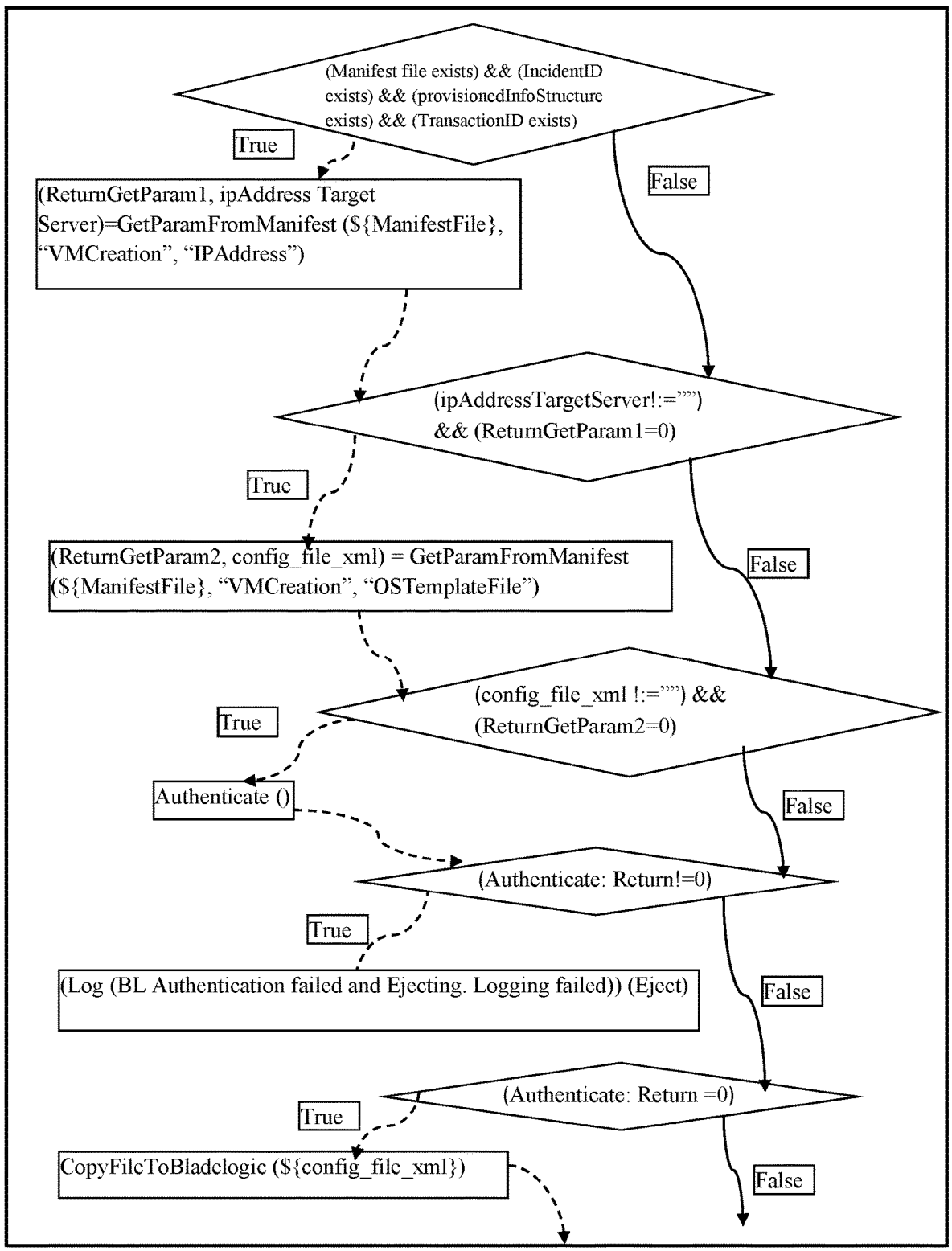
FIG. 10 illustrates a flowchart for a service operation 'VMProvision' for a technical service—'Linux Instance as a Service', in accordance with an exemplary embodiment of the present subject matter.
Figure 10B:
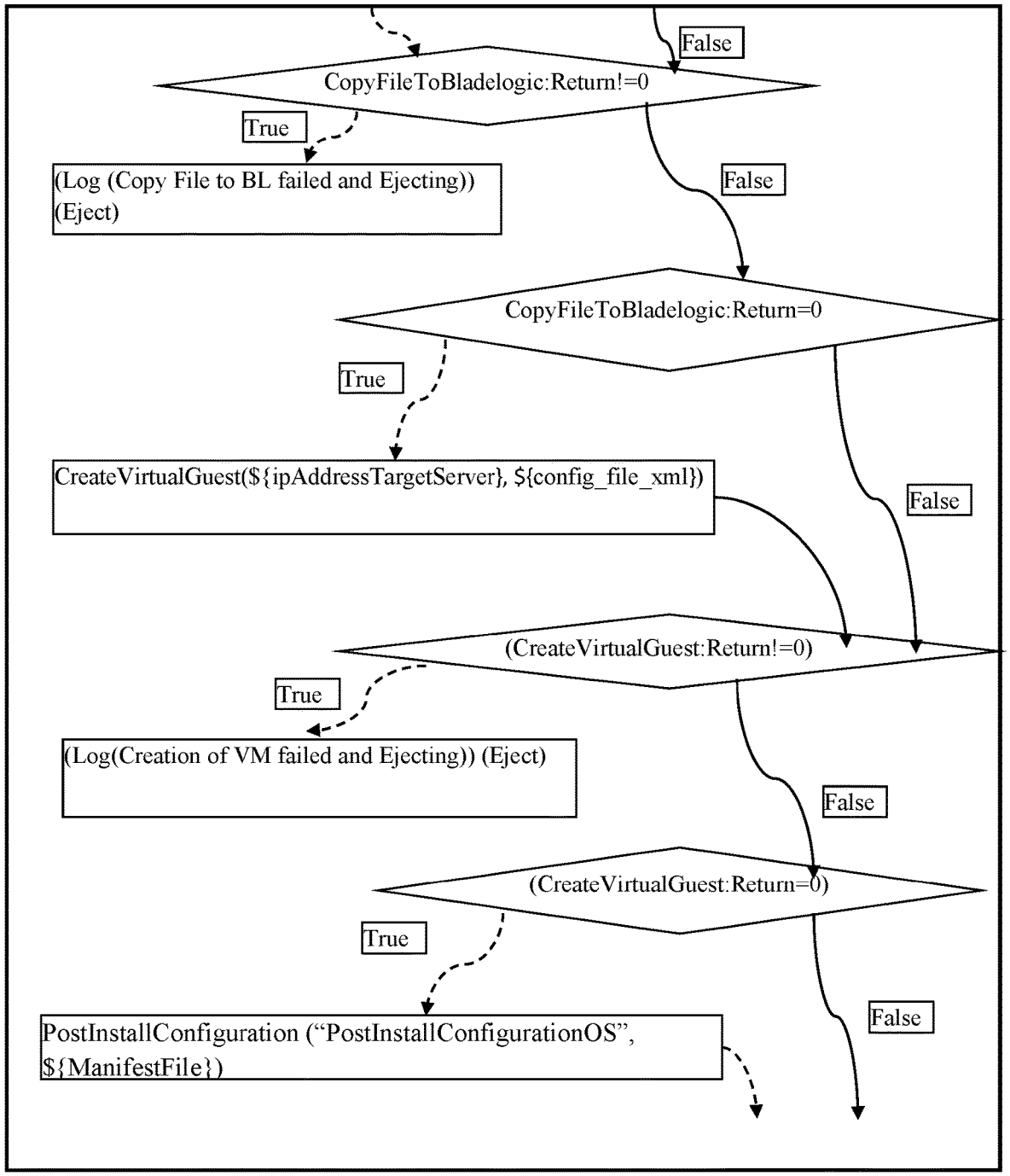
Figure 10C:
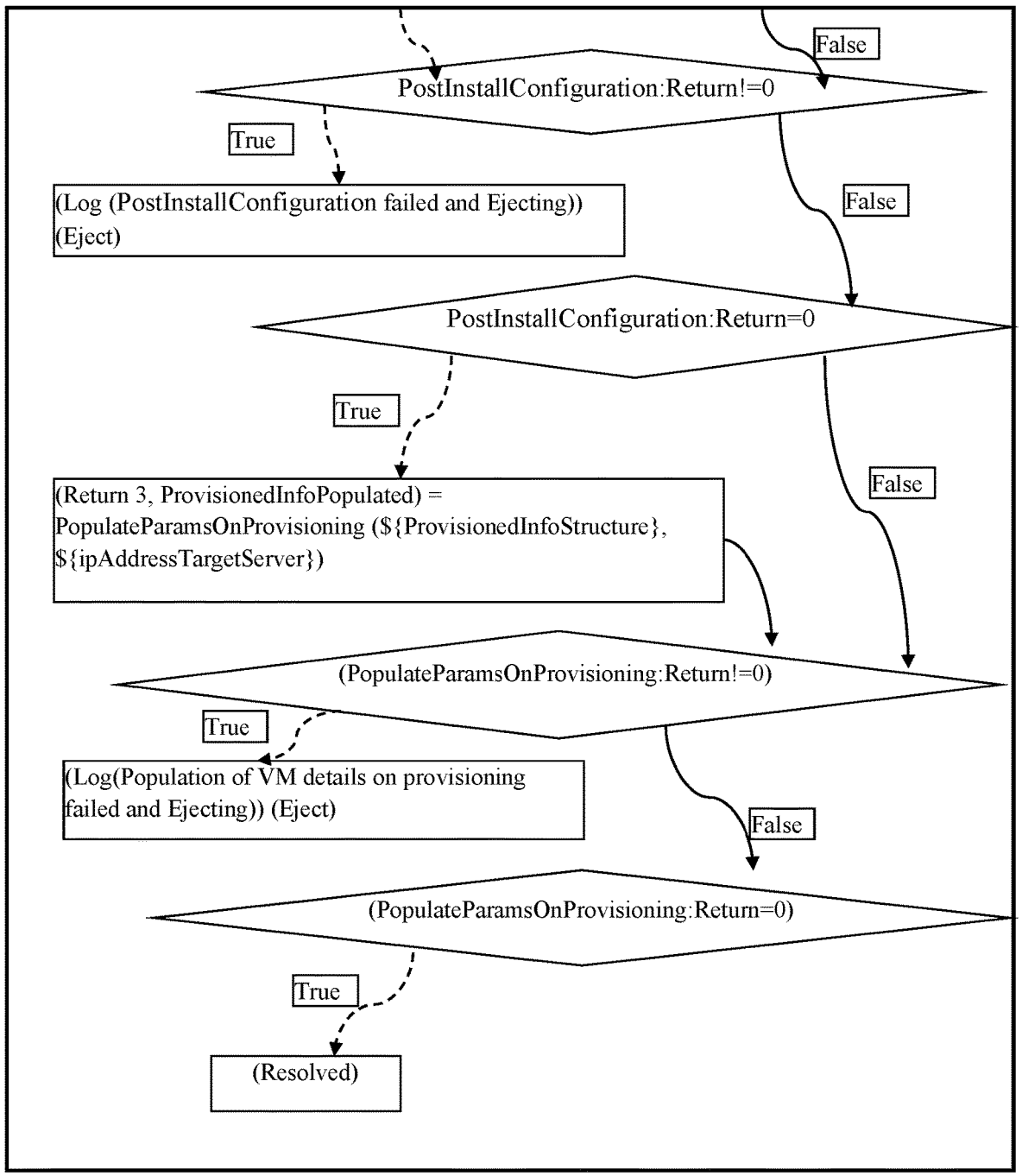

Referring to FIG. 10, technical service—'Linux™ Instance as a Service' is explained. The technical service—'Linux™ Instance as a Service' comprises a service operation 'VMProvision', used to perform a task of provisioning or creating a Linux™ Virtual Machine. The 'VMProvision' service operation uses standard operators from two technical resources namely 'Linux™' and 'Bladelogic™'. 'Bladelogic™' is a provisioning technical tool form BMC™ Software. The 'Linux™' technical resource comprises standard operators for Linux™ and Bladelogic™ technical resource comprises standard operators for Bladelogic™, and are documented in the 'Resource—Linux™' and 'Resource—Blade Logic™' respectively. Also the technical service—'Linux™ Instance as a Service' needs 'Resource—Operating System' as a parent technical resource.

Referring to FIG. 10, a flowchart for the service operation 'VMProvision' is provided. The technical service—'Linux™ Instance as a Service' has details comprising the technical service ID, technical service description, service operation ID, Service operation type, service operation subtypes and followed by description of steps of the service operation. The technical service details further comprise list of standard operators used and the service operation, wherein the standard operator belongs to the service operation. Referring to FIG. 10, execution of predicate-action pairs of the service operation 'VMProvision' is explained. Rules associated with the service operation 'VMProvision' are implemented by means of the predicate-action pairs. The 'VMProvision' receives required standard operators and parameters initially.

In first rule, the predicate of first predicate-action pair verifies for existence of parameters of the service operation. If the parameters exist, then in action part of the first predicate-action pair 'GetParamFromManifest' standard operator is called with Manifestfile, VMCreation and IPAddress as parameters. Return (exit code) and output of the standard operator 'GetParamFromManifest' is collected in 'ReturnGetParam1' and 'ipAddressTargetServer' respectively.

In second rule, in second predicate-action pair, in predicate part, if 'ipAddressTargetServer' is not empty and 'ReturnGetParam1' is equal to '0', 'GetParamFromManifest' standard operator is called with 'Manifestfile', 'VMCreation' and 'OSTemplateFile' as parameters. Return (exit code) and output of the standard operator 'GetParamFromManifest' is collected in 'ReturnGetParam2' and 'config_file_xml' respectively.

If 'config_file_xml' is not empty and 'ReturnGetParam2' is equal to '0', then standard operator 'Authenticate' is called. If the exit code of the standard operator 'Authenticate' returns anything other than '0', the service operation is ejected with log 'BL authentication failed and ejecting. Logging Failed'.

If return (exit code) of the standard operator 'Authenticate' returns '0', standard operator 'CopyFileToBladelogic' is called with 'config_file_xml' as parameter. The rest of the rules that is predicate-action pairs, are executed based on satisfaction of the conditions. The service operation 'VMProvision' uses standard operators of Linux™ and Bladelogic™ technical resources. The service operation 'VMProvision' authenticates to the Bladelogic™ technical resource, creates Virtual guest, does the post install configuration tasks and resolves the task for the provisioning or creating the Linux™ Virtual Machine.

The technical service 'Oracle™ Instance as a Service' is explained below. The knowledge structure for Oracle™ is same as that for Linux™. The technical service 'Oracle™ Instance as a Service' comprises service operations for e.g. 'ResizingDatafiles' to resize existing data files of Oracle™ database. The technical service 'Oracle™ Instance as a Service' uses Linux™ and Oracle™ technical resources which are 'Resource—Linux™' and 'Resource—Oracle™' respectively and uses 'Resource—Database' as a parent technical resource.

In first rule—predicate of first predicate-action pair verifies for existence and emptiness of parameters of the service operation 'ResizingDatafiles'. If the parameters are empty or does not exist, log is generated saying 'Insufficient Parameters/Values' and the service operation 'ResizingDatafiles' is ejected.

In second rule, if the parameters are not empty, the standard operator 'checkHostReachability' is called with 'HostName' being passed as a parameter. If the standard operator 'checkHostReachability' returns return (exit code) other than '0' indicating that command/script not executed successfully, in turn signify that hostname is not reachable, the service operation 'ResizingDatafiles' is ejected with the log 'HostName does not exist'.

If the standard operator 'checkHostReachability' returns the exit code '0', which indicates that the hostname is reachable, then standard operator 'getDBInstanceName' is called with 'HostName', 'LoginName' and 'DBInstanceName' as parameters. If return (exit code) of the standard operator 'getDBInstanceName' is not equal to '1', the service operation 'ResizingDatafiles' ejected with the log 'Database name not available'. If return (exit code) of the standard operator 'getDBInstanceName' is equal to '1', a standard operator 'getTablespace' is called with 'HostName', 'DBInstanceName' and 'TableSpaceName' as parameters.

If the standard operator 'getTablespace' returns NULL Output, the service operation 'ResizingDatafiles' is ejected with the log 'Table space does not exist'. If the standard operator 'getTablespace' does not return NULL Output, standard operator 'getDatafile' is called with 'HostName', 'DBInstanceName', 'DataFileName' and 'TableSpaceName' as parameters. If the standard operator 'getDatafile' returns NULL Output, the service operation 'ResizingDatafiles' is ejected with the log 'Data file does not exist'. If the standard operator 'getDatafile' does not return NULL Output, standard operator 'getFile' is called with 'HostName', 'LoginName' and 'DataFileName' as parameters and return (exit code) and output of the standard operator 'getFile' is collected in 'getFileReturn1' and 'getFileOutput1' respectively. If 'getFileReturn1' is not equal to '0', the service operation 'ResizingDatafiles' is ejected with log 'File system not found'. If 'getFileReturn1' not equal to '0', the standard operator 'getFile' is called with 'HostName', 'LoginName' and 'FolderPath' as parameters and return (exit code) and output of the standard operator 'getFile' is collected in 'getFileReturn2' and 'getFileOutput2' respectively.

If getFileReturn2 is not equal to '0', a standard operator 'createFolder' is called with 'HostName', 'LoginName' and 'FolderPath' as parameters. If return (exit code) of the standard operator 'createFolder' is not equal to '0', the service operation 'ResizingDatafiles' is ejected with log 'Unable to create the Folder Path'. If the return (exit code) for the standard operator 'createFolder' is equal to '0' or 'getFileReturn2' is equal to '0', standard operator 'CreateDirectory' is called with 'HostName', 'DBInstanceName', 'DirectoryName' and 'FolderPath' as parameters. Similarly rest of the predicate-action pairs is executed based on satisfaction of the conditions. The service operation 'ResizingDatafiles' takes required Oracle data file, takes necessary backup information, resizes the oracle data file, and resolves the task for resizing data file of the oracle database.

Exemplary embodiments discussed above may provide certain advantages. Though not required to practice aspects of the disclosure, these advantages may include those provided by the following features.

Some embodiments of the present disclosure enable a system and a method for capturing knowledge in a structured and executable form.

Some embodiments enable automatic generation of knowledge structures from information captured in an entity-relationship model, wherein the knowledge structures are uniform, standardized and structured, enabling polymorphic calling of the knowledge structures and reusing of the knowledge structures.

Some embodiments enable polymorphic calling of the knowledge structures simple and problem free.

Some embodiments enable modeling of the knowledge structure and polymorphic calling of the knowledge structures irrespective of underlying technologies/system's implementation.

Some embodiments enable modeling of the knowledge structures independent of the underlying operating technologies/system's implementation, makes the knowledge structures reusable.

Some embodiments enable reuse of the knowledge structures through inheritance.

Some embodiment enable removal of non-uniformity and duplication of the knowledge in the knowledge structures, results in greater understandability, maintainability, reusability and ease of analysis of the knowledge in the knowledge structures. Some embodiment enabling the removal of non-uniformity and duplication of the knowledge in the knowledge structures and the reuse of the knowledge structures through inheritance results in optimized use of memory space.

Figure 11:
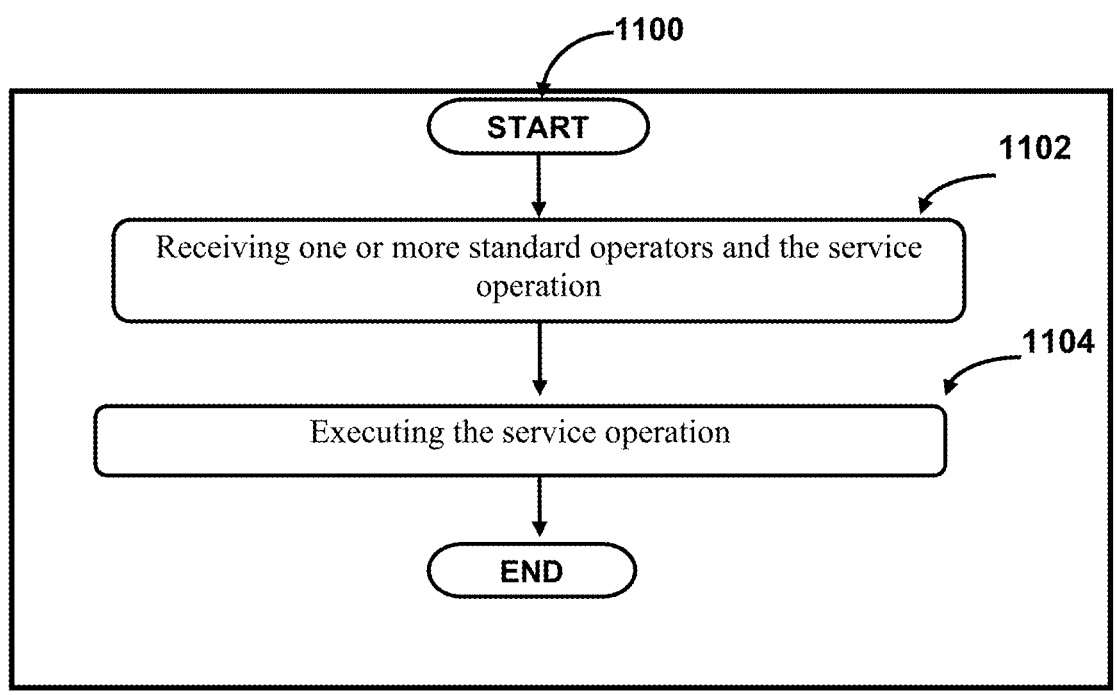
FIG. 11 illustrates a method for modeling and executing a service operation associated with a technical service, in accordance with an embodiment of the present subject matter.

Referring now to FIG. 11, a method 1100 for modeling and executing a service operation associated with a technical service is shown, in accordance with an embodiment of the present subject matter. The method 1100 may be described in the general context of computer executable instructions. Generally, computer executable instructions can include routines, programs, objects, components, data structures, procedures, modules, functions, etc., that perform particular functions or implement particular abstract data types. The method 1100 may also be practiced in a distributed computing environment where functions are performed by remote processing devices that are linked through a communications network. In a distributed computing environment, computer executable instructions may be located in both local and remote computer storage media, including memory storage devices.

The order in which the method 1100 is described is not intended to be construed as a limitation, and any number of the described method steps can be combined in any order to implement the method 1100 or alternate methods. Additionally, individual blocks may be deleted from the method 1100 without departing from the spirit and scope of the subject matter described herein. Furthermore, the method can be implemented in any suitable hardware, software, firmware, or combination thereof. However, for ease of explanation, in the embodiments described below, the method 1100 may be considered to be implemented in the above described system 102. The method comprises modeling of knowledge required for execution of the service operation by representing factual knowledge and actionable knowledge, of the knowledge, in executable form.

At step 1102, the service operation may be modeled to provide a technical service. In order to model the service operation, at step 1102, one or more standard operators and the service operation may be represented. In one implementation, the one or more standard operators and the service operation may be represented by the representation module 212. In another implementation, the one or more standard operators and the service operation may be received by the representation module 212. The one or more standard operators may represent the factual knowledge in the executable form. The service operation may comprise parameters and rules associated with the service operation. The rules may be present in form of a list of predicate-action pairs. The list of predicate-action pairs may represent the actionable knowledge in the executable form. A predicate-action pair of the list of predicate-action pairs may comprise a predicate and an action. The predicate may define a condition to be verified to comply with a rule of the rules, and the action may specify at least one standard operator of the one or more standard operators to be executed based on the verification of the condition.

The one or more standard operators may be generated by using at least one of one or more entities, association between two or more entities, one or more attributes of the one or more entities, and one or more property tags of the one or more entities. The one or more standard operators are of types comprising entity related standard operator, attribute related standard operator, association related standard operator. The one or more property tags may comprise one or more verbs and the one or more verbs may be an operation to be performed on the one or more entities, or an association between two or more entities, or the one or more attributes.

The service operation may be generated by using a state changing property of a verb and a condition. The verb may be an operation to be performed on an entity, or an association between two or more entities, or an attribute. The attribute may be a property of the entity or the association. The condition may be a state associated with the entity. The service operation may be of types comprising 'Wrapper service operations' and 'Issue type service operations'.

At step 1104, the service operation may be executed. Further, the step 1104 may be explained in greater detail in FIG. 12. At step 1104, the service operation may be executed to provide the technical service.

Figure 12:
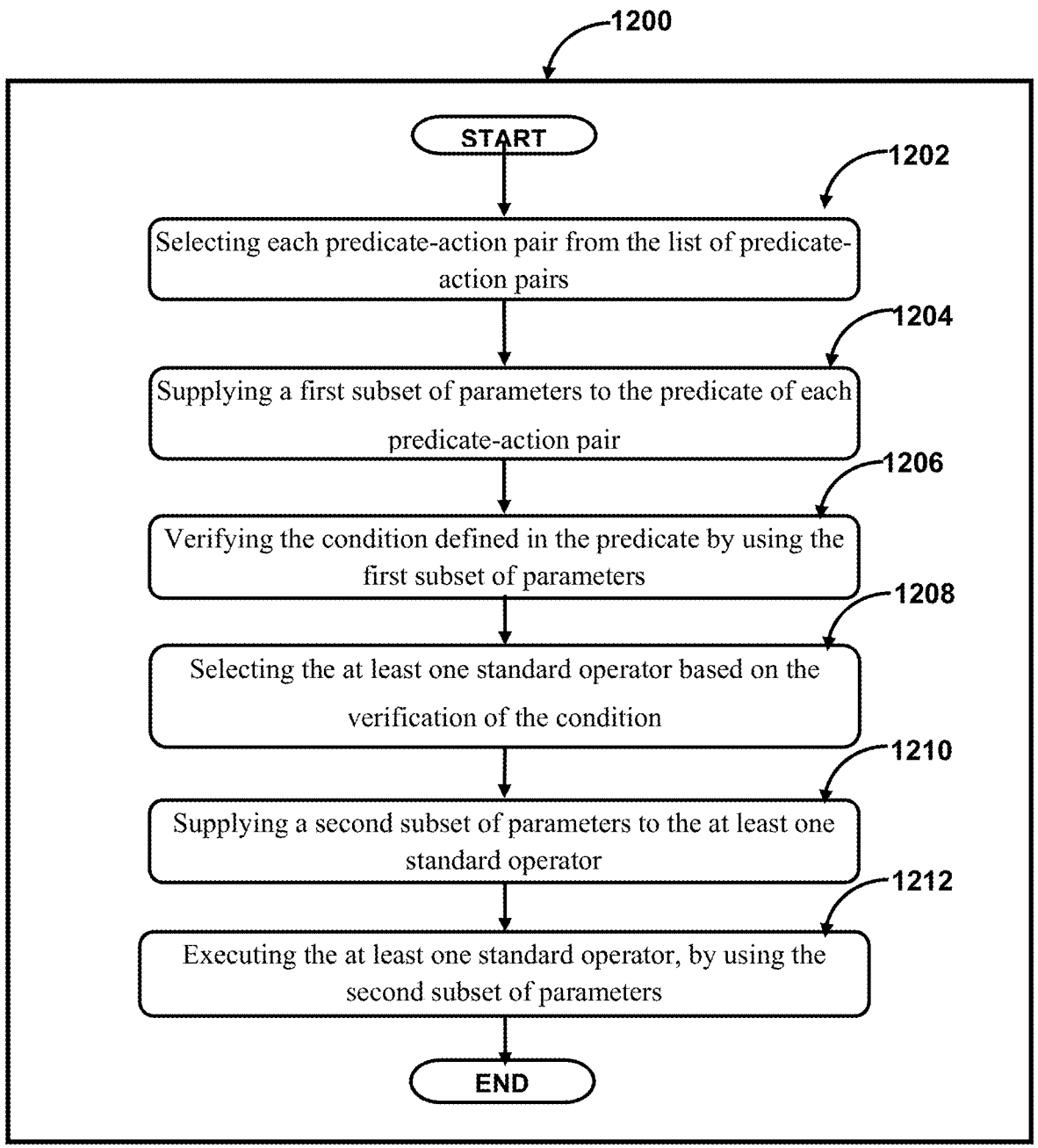
FIG. 12 illustrates a method for executing the service operation, in accordance with an embodiment of the present subject matter.

Referring now to FIG. 12, a method 1104 for executing the service operation is shown, in accordance with an embodiment of the present subject matter.

At step 1202, each predicate-action pair from the list of predicate-action pairs may be selected. In one implementation, each predicate-action pair from the list of predicate-action pairs may be selected by the execution module 214.

At step 1204, a first subset of parameters may be supplied to the predicate of the each predicate-action pair. In one implementation, the first subset of parameters may be supplied to the predicate of the each predicate-action pair by the execution module 214.

At step 1206, the condition defined in the predicate may be verified by using the first subset of parameters to comply with the rule. In one implementation, the condition defined in the predicate may be verified by the execution module 214 by using the first subset of parameters to comply with the rule.

At step 1208, the at least one standard operator may be selected based on the verification of the condition. The at least one standard operator may be selected, when the condition is satisfied/true, by using the first subset of parameters. In one implementation, the at least one standard operator may be selected by the execution module 214 based on the verification of the condition.

At step 1210, a second subset of parameters may be supplied to the at least one standard operator. In one implementation, the second subset of parameters may be supplied to the at least one standard operator by the execution module 214.

At step 1212, the at least one standard operator may be executed by using the second subset of parameters. Thereby the service operation may be executed to provide the technical service. In one implementation, the at least one standard operator may be executed by using the second subset of parameters by the execution module 214.

The method 1200, further comprises supplying the output and the return of the execution of the standard operator or the service operation return and the service operation output of the execution of the service operation along with the first subset of parameters to a predicate of a predicate-action pair of the list of predicate-action pairs for verification of a condition defined in the predicate.

According to method 1200, in step 1206, the verification of the condition comprises verifying whether the return of the standard operator execution satisfies an arithmetic or string operations, and/or verifying whether the output of the standard operator execution satisfies an arithmetic or string operations.

The method 1100 further may comprise receiving technical resources required for modeling and executing the service operation associated with the technical service. The technical resources may comprise at least one parent resource and at least one child resource. The at least one parent resource may comprise at least one of a set of parent resource standard operators and one or more parent resource service operations. The at least one child resource may comprise at least one of a set of child resource standard operators and one or more child resource service operations. Further the at least one parent resource and the at least one child resource may be associated with each other in a parent-child relationship. The parent-child relationship may signify that the at least one child resource inherits the at least one of the set of parent resource standard operators and the one or more parent resource service operations.

When a parent resource standard operator of the set of parent resource standard operators or a parent resource service operation of the one or more parent resource service operations conflict with a child resource standard operator of the set of child resource standard operators and a child resource service operation of the one or more child resource service operations respectively, then the child resource standard operator may override the parent resource standard operator and the child resource service operation may override the parent resource service operation. The overriding of the child resource service operation may comprise overriding the rules of the parent resource service operation. The overriding of the child resource standard operator may comprise overriding the executable function of the parent resource standard operator.

The at least one of the parent resource standard operator, the parent resource service operation, the child resource standard operator and the child resource service operation may be selected based on the verification of the condition and executed for modeling and execution of the service operation.

The method 1100 further may comprise receiving technical tools required for modeling and executing the service operation associated with the technical service. The technical tools may comprise at least one parent tool and at least one child tool. The at least one parent tool may comprise at least one of a set of parent tool standard operators and one or more parent tool service operations. The at least one child tool may comprise at least one of a set of child tool standard operators and one or more child tool service operations. The at least one parent tool and the at least one child tool may be associated with each other in a parent-child relationship. The parent-child relationship may signify that the at least one child tool inherits the at least one of the set of parent tool standard operators and the one or more parent tool service operations.

When a parent tool standard operator of the set of parent tool standard operators or a parent tool service operation of the one or more parent tool service operations may conflict with a child tool standard operator of the set of child tool standard operators and a child tool service operation of the one or more child tool service operations respectively, then the child tool standard operator may override the parent tool standard operator and the child tool service operation may override the parent tool service operation. The overriding of the child tool service operation may comprise overriding the rules of the parent tool service operation. The overriding of the child tool standard operator may comprise overriding the executable function of the parent tool standard operator.

At least one of the parent tool standard operator, the parent tool service operation, the child tool standard operator and the child tool service operation may be selected based on the verification of the condition and executed for modeling and execution of the service operation.

The method 1100 further comprises implementation of a polymorphism technique while executing at least one of a) the one or more standard operators and b) the service operation at runtime. The polymorphism technique comprises picking up a standard operator implementation and/or a service operation implementation based on matching of the execution environment with one or more bindings for execution of the standard operator and/or the service operation. The one or more bindings comprise execution environment data provided in a technical resource or a technical tool or a technical service. The polymorphism technique enables execution of the service operation and execution of the standard operator independent of an underlying technology and enables reusability of the knowledge.

Although implementations for methods and systems for modeling and executing a service operation associated with a technical service have been described in language specific to structural features and/or methods, it is to be understood that the appended claims are not necessarily limited to the specific features or methods described. Rather, the specific features and methods are disclosed as examples of implementations for modeling and executing a service operation associated with a technical service.

We claim:

1. A method for modeling and executing a service operation associated with a technical service, the method comprising:

modeling of knowledge required for execution of a number of service operations associated with a plurality of technical services by representing the knowledge in knowledge structures in structured, uniform, executable and in reusable form, wherein the plurality of technical services are implemented using the knowledge structures comprising one or more service operations and/or one or more standard operators, wherein the one or more service operations comprise one or more tasks for servicing a request or solving an issue in a service industry, and the one or more standard operators are one or more modular individual sub-tasks to be used by the one or more service operations, and at least one technical service implements one or more infrastructure technology management services comprising provisioning services, incident management, compliance services, and change management associated with one or more platforms, one or more operating systems, one or more infrastructures, one or more technical resources and technical tools, wherein structure for each of the one or more service operations and the one or more standard operators are automatically generated based on information, associated with an organization, captured in an entity-relationship model, the one or more service operations and the one or more standard operators are uniform, standardized and structured, enabling polymorphic calling of the service operation and the standard operator, wherein the structure for a service operation of the one or more service operations is automatically generated by using a state changing property of a verb and a condition from the entity relationship model, wherein the verb is an operation to be performed on an entity, or an association between two or more entities, or an attribute, and wherein the attribute is a property of the entity or the association, and wherein the condition is a state associated with the entity, and wherein the structure of each of the one or more standard operators is automatically generated by using one or more of a) one or more entities, b) association between two or more entities, c) one or more attributes, d) one or more property tags and e) one or more conditions defined in the Entity relationship model;

wherein the modeling comprises, representing, by a processor, the one or more standard operators comprising an executable function or an executable command, and the service operation, wherein the service operation comprises parameters and rules associated with the service operation, and the rules comprise a list of predicate-action pairs, wherein the list of predicate-action pairs represent an actionable knowledge in executable form in a sequence of a plurality of steps and/or sub-steps to perform at least one task associated with the technical service, and the list of predicate-action pairs are executed in sequence of the plurality of steps and/or sub-steps in order to perform the at least one task associated with the technical service, and wherein a predicate-action pair of the list of predicate-action pairs comprises a predicate and an action, and wherein the predicate defines a condition to be verified to comply with a rule of the rules, and the action specifies at least one of a standard operator of the one or more standard operators or an additional service operation to be executed based on the verification of the condition; and executing the service operation to perform the at least one task related to the technical service to provide the technical service, wherein the execution comprises:

selecting, by the processor, predicate-action pairs from the list of predicate-action pairs in the sequence of flow; and supplying, by the processor, a first subset of parameters to the predicate of each selected predicate-action pair;

verifying, by the processor, the condition defined in the predicate of the each selected predicate action-pair by using the first subset of parameters;

selecting the at least one of the standard operator or the additional service operation from the action of the each selected predicate-action pair, based on the verification of the condition; and supplying, by the processor, a second subset of parameters to the at least one of the standard operator or the additional service operation of the each selected predicate-action pair;

executing, by the processor, the at least one of the standard operator or the additional service operation, by using the second subset of parameters, for each selected predicate-action pair in the sequence of flow.

2. The method of claim 1, wherein the structure of the standard operator comprises a name and one or more parameters of the standard operator, wherein the one or more standard operators are of types comprising entity related standard operator, attribute related standard operator, association related standard operator, and condition related standard operator and wherein the one or more property tags comprises one or more verbs, and wherein the one or more verbs is an operation to be performed on the one or more entities, or an association between two or more entities, or the one or more attributes.

3. The method of claim 1, wherein the structure of the service operation comprises a name and one or more parameters of the service operation, wherein the service operation is of types comprising a state changing service operation and an Issue related service operation, wherein the state changing service operation is generated using the verb having the state changing property, and the issue related service operation is generated using the verb associated with the condition.

4. The method of claim 1, wherein the at least one standard operator comprises a set of factors, an executable function, a return and a output, and a timeout, wherein the set of factors collects the second subset of parameters, the executable function comprises a command or a script to be executed in order to perform a task.

5. The method of claim 1, wherein the service operation further comprises a service operation return and a service operation output and an alert, wherein the service operation output signifies one or more key-value pairs, the service operation return signifies a status of termination of the service operation, and the alert signifies one or more events to be serviced by the service operation.

6. The method of claim 1, wherein the action further specifies at least one of one or more service operations and built-in functions to be executed based on the verification of the condition, wherein the built-in functions comprise an eject, a resolve and a log.

7. The method of claim 4, wherein the output and the return of execution of the standard operator, or a service operation return and a service operation output of execution of the service operation along with the first subset of parameters is supplied to the predicate of the predicate-action pair of the list of predicate-action pairs for verification of the condition defined in the predicate.

8. The method of claim 1, wherein the verification of the condition comprises verifying whether the return of execution of the standard operator satisfies an arithmetic or string operation, or verifying whether the output of execution of the service operation satisfies an arithmetic or string operation.

9. The method of claim 1, further comprises receiving the technical resource, wherein the technical resource comprise at least one parent resource and at least one child resource, wherein the at least one parent resource comprises at least one of parent resource standard operators and one or more parent resource service operations, and the at least one child resource comprises at least one of child resource standard operators and one or more child resource service operations, further the at least one parent resource and the at least one child resource are associated with each other in a parent-child relationship, wherein the parent-child relationship signifies that the at least one child resource inherits the at least one of the parent resource standard operators and the one or more parent resource service operations.

10. The method of claim 9, wherein when a parent resource standard operator of the parent resource standard operators or a parent resource service operation of the one or more parent resource service operations conflict with a child resource standard operator of the child resource standard operators and a child resource service operation of the one or more child resource service operations respectively then the child resource standard operator overrides the parent resource standard operator and the child resource service operation overrides the parent resource service operation, wherein the overriding of the child resource service operation comprises overriding the rules of the parent resource service operation, and the overriding of the child resource standard operator comprises overriding the executable function of the parent resource standard operator.

11. The method of claim 10, wherein at least one of a) the parent resource standard operator, b) the parent resource service operation, c) the child resource standard operator and d) the child resource service operation is selected based on the verification of the condition and is executed for execution of the service operation.

12. The method of claim 1, further comprises receiving the technical tool, wherein the technical tool comprises at least one parent tool and at least one child tool, wherein the at least one parent tool comprises at least one of parent tool standard operators and one or more parent tool service operations, and the at least one child tool comprises at least one of child tool standard operators and one or more child tool service operations, further the at least one parent tool and the at least one child tool are associated with each other in a parent-child relationship, wherein the parent-child relationship signifies that the at least one child tool inherits the at least one of the parent tool standard operators and the one or more parent tool service operations.

13. The method of claim 12, wherein when a parent tool standard operator of the parent tool standard operators or a parent tool service operation of the one or more parent tool service operations conflict with a child tool standard operator of the child tool standard operators and a child tool service operation of the one or more child tool service operations respectively then the child tool standard operator overrides the parent tool standard operator and the child tool service operation overrides the parent tool service operation, wherein the overriding of the child tool service operation comprises overriding the rules of the parent tool service operation, and the overriding of the child tool standard operator comprises overriding the executable function of the parent tool standard operator.

14. The method of claim 13, wherein at least one of a) the parent tool standard operator, b) the parent tool service operation, c) the child tool standard operator and d) the child tool service operation is selected based on the verification of the condition and executed for execution of the service operation.

15. The method of claim 1, wherein a polymorphism technique is implemented while executing at least one of a) the one or more standard operators and b) the service operation at runtime, wherein the polymorphism technique comprises picking up of a standard operator implementation and/or a service operation implementation based on matching of the execution environment with one or more bindings for execution of the standard operator and/or the service operation, wherein the one or more bindings comprise execution environment data provided in a technical resource or a technical tool or a technical service, and wherein the polymorphism technique enables execution of the service operation and execution of the standard operator independent of an underlying technology and enable reusability of the knowledge.

16. A system for modeling and executing a service operation associated with a technical service, the system comprising:
 a processor; and
 a memory coupled to the processor, wherein the processor is capable of executing a plurality of modules stored in the memory, and wherein the plurality of module comprising:
  a representation module models knowledge required for execution of a number of service operations associated with a plurality of technical services by representing the knowledge in knowledge structures in structured, uniform, executable and in reusable form, wherein the plurality of technical services are implemented using the knowledge structures comprising one or more service operations and/or one or more standard operators, wherein the one or more service operations comprise one or more tasks for servicing a request or solving an issue in a service industry, and the one or more standard operators are one or more modular individual sub-tasks to be used by the one or more service operations, and the technical service implements one or more infrastructure technology management services comprising provisioning services, incident management, compliance services, and change management associated with one or more platforms, one or more operating systems, one or more infrastructures, one or more technical resources and technical tools, wherein structure for each of the one or more service operations and the one or more standard operators are automatically generated based on information, associated with an organization, captured in an entity-relationship model, the one or more service operations and the one or more standard operators are uniform, standardized and structured, enabling polymorphic calling of the service operation and the standard operator, wherein the structure of a service operation of the one or more service operations is automatically generated by using a state changing property of verb and condition from the entity relationship model, wherein the verb is an operation to be performed on an entity, or an association between two or more entities, or an attribute, and wherein the attribute is a property of the entity or the association, and wherein the condition is a state associated with the entity, and wherein the structure of each of the one or more standard operators are automatically generated by using one or more of a) one or more entities, b) association between two or more entities, c) one or more attributes, d) one or more property tags and e) one or more conditions defined in the Entity relationship model; the representation module represents, the one or more standard operators comprising an executable function or an executable command, and the service operation, the service operation comprises parameters and rules associated with the service operation, and the rules comprise a list of predicate-action pairs, wherein the list of predicate-action pairs represent an actionable knowledge in executable form in a sequence of a plurality of steps and/or sub-steps to perform at least one task associated with the technical service, and the list of predicate-action pairs are executed in sequence of the plurality of steps and/or sub-steps in order to perform the at least one task associated with the technical service, and wherein a predicate-action pair of the list of predicate-action pairs comprises a predicate and an action, wherein the predicate defines a condition to be verified to comply with a rule of the rules, and the action specifies at least one of a standard operator of the one or more standard operators or an additional service operation to be executed based on the verification of the condition; and an execution module executes the service operation to perform the at least one task related to the technical service to provide the technical service by, selecting, predicate-action pairs from the list of predicate-action pairs in the sequence of flow; and supplying, a first subset of parameters to the predicate of the each selected predicate-action pair;

verifying, the condition defined in the predicate of the each selected predicate-action pair by using the first subset of parameters to comply with the rule;

selecting the at least one of the standard operator or the another service operation from the action of the each selected predicate-action pair, based on the verification of the condition, and supplying, a second subset of parameters to the at least one of the standard operator or the additional service operation of the each selected predicate-action pair;

executing, the at least one of the standard operator or the additional service operation, by using the second subset of parameters for each selected predicate-action pair in the sequence of flow.

17. The system of claim 16, wherein the at least one standard operator comprises a set of factors, an executable function, a return and an output, and a timeout, wherein the set of factors collects the second subset of parameters, the executable function comprises a command or a script.

18. The system of claim 16, wherein the action further specifies at least one of one or more service operations and built-in functions to be executed based on the verification of the condition, wherein the built-in functions comprise an eject, a resolve and a log.

19. A non-transitory computer readable medium embodying a program executable in a computing device for modeling and executing a service operation associated with a technical service, the program comprising:

a program code for modeling the knowledge required for execution of a number of service operations associated with a plurality of technical services by representing the knowledge in knowledge structures in structured, uniform, executable and in reusable form, wherein the plurality of technical services are implemented using the knowledge structures comprising one or more service operations and/or one or more standard operators, wherein the one or more service operations comprise one or more tasks servicing a request or solving an issue in a service industry, and the one or more standard operators are one or more modular individual sub-tasks to be used by the one or more service operations, and at least one technical service implements one or more infrastructure technology management services comprising provisioning services, incident management, compliance services, and change management associated with one or more platforms, one or more operating systems, one or more infrastructures, one or more technical resources and technical tools, wherein structure for each of the one or more service operations and the one or more standard operators are automatically generated from information, associated with an organization, captured in an entity-relationship model, wherein the one or more service operations and the one or more standard operators are uniform, standardized and structured, enabling polymorphic calling of the service operation and the standard operator, wherein the structure of a service operation of the one or more service operations is automatically generated by using a state changing property of verb and condition from the entity relationship model, wherein the verb is an operation to be performed on an entity, or an association between two or more entities, or an attribute, and wherein the attribute is a property of the entity or the association, and wherein the condition is a state associated with the entity, and wherein the structure for each of the one or more standard operators are automatically generated by using one or more of a) one or more entities, b) association between two or more entities, c) one or more attributes, d) one or more property tags and e) one or more conditions defined in the Entity relationship model;

the program code for modeling the knowledge represents, the one or more standard operators comprising an executable function or an executable command, and the service operation, wherein the service operation comprises rules and parameters, and the rules comprise a list of predicate-action pairs, wherein the list of predicate-action pairs represent an actionable knowledge in executable form in a sequence of a plurality of steps and/or sub-steps to perform at least one task associated with the technical service, and the list of predicate-action pairs are executed in sequence of the plurality of steps and/or sub-steps in order to perform the at least one task associated with the technical service and wherein a predicate-action pair of the list of predicate-action pairs comprises a predicate and an action, wherein the predicate defines a condition to be verified to comply with a rule of the rules, and the action specifies at least one of a standard operator of the one or more standard operators or additional service operation to be executed based on the verification of the condition; and a program code for executing the service operation to
perform the at least one task related to the technical
service to provide the technical service by,
- selecting, predicate-action pairs from the list of predicate-action pairs in the sequence of flow; and
- supplying, a first subset of parameters to the predicate of the each selected predicate-action pair;
- verifying, the condition defined in the predicate of the each selected predicate-action pair by using the first subset of parameters to comply with the rule;
- selecting the at least one of the standard operator or the additional service operation from the action of each selected predicate-action pair, based on the verification of the condition, and
- supplying, a second subset of parameters to the at least one of the standard operator or the additional service operation of the each selected predicate-action pair;
- executing, the at least one of the standard operator or the additional service operation, by using the second subset of parameters for each selected predicate-action pair in the sequence of flow.

20. The method of claim 1, wherein the technical service comprises one or more of a platform as a service, an operating system as a service, a database as a service, Application instance as a service, and an infrastructure as a service.

* * * * *